(12) United States Patent  (10) Patent No.: US 8,820,447 B2
Carter et al.  (45) Date of Patent: Sep. 2, 2014

(54) POWER GENERATION SYSTEMS AND METHODS FOR WHEELED OBJECTS

(75) Inventors: Scott J. Carter, Seal Beach, CA (US); Stephen E. Hannah, Placentia, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 1976 days.

(21) Appl. No.: 11/277,029

(22) Filed: Mar. 20, 2006

(65) Prior Publication Data

US 2006/0249320 A1  Nov. 9, 2006

Related U.S. Application Data

(60) Provisional application No. 60/663,147, filed on Mar. 18, 2005, provisional application No. 60/663,327, filed on Mar. 18, 2005, provisional application No. 60/663,195, filed on Mar. 18, 2005.

(51) Int. Cl.
*B60K 1/00* (2006.01)

(52) U.S. Cl.
USPC ............................... 180/65.51; 188/19

(58) Field of Classification Search
USPC .......... 180/65.5, 65.6, 65.3, 181; 280/33.994; 16/45; 188/19
See application file for complete search history.

(56) References Cited

U.S. PATENT DOCUMENTS

| | | | |
|---|---|---|---|
| 2,964,140 A | 12/1960 | Berezny | |
| 3,002,370 A | 10/1961 | La Brie | |
| 3,031,037 A | 4/1962 | Stollman | |
| 3,031,038 A | 4/1962 | Chait | |
| 3,117,655 A | 1/1964 | Skupas et al. | |
| 3,317,841 A | 5/1967 | Umanoff | |
| 3,340,710 A | 9/1967 | O'Brien | |
| 3,380,546 A * | 4/1968 | Rabjohn | 180/15 |
| 3,394,945 A | 7/1968 | Steier et al. | |
| 3,475,036 A | 10/1969 | Smith | |

(Continued)

FOREIGN PATENT DOCUMENTS

| | | |
|---|---|---|
| CN | 101171147 B | 7/2011 |
| GB | 2379804 A | 3/2003 |

(Continued)

OTHER PUBLICATIONS

Press release titled "Gatekeeper Systems announces new product launch," dated Feb. 18, 2005.

(Continued)

*Primary Examiner* — Jeffrey J Restifo
(74) *Attorney, Agent, or Firm* — Knobbe, Martens, Olson & Bear, LLP

(57) ABSTRACT

A power generation system for wheeled objects comprises a generator mechanically coupled to one or more of the object's wheels to convert wheel rotational energy into electrical energy. The power generation system may comprise an electrical storage device configured to store the electrical power produced by the generator. Power from the generator and/or the electrical storage device can be used to provide power to other electrical systems in or on the object. In certain embodiments, the electrical storage device comprises a bank of high-capacity capacitors connected in series. Some embodiments use a control circuit, for example, to regulate the charging and discharging of the capacitor bank and to provide suitable voltages for other systems. The power generation system may be disposed within an object's wheel, such as a wheel of a shopping cart.

72 Claims, 12 Drawing Sheets

(56) References Cited

U.S. PATENT DOCUMENTS

| | | | |
|---|---|---|---|
| 3,590,962 A * | 7/1971 | Parker et al. | 188/111 |
| 3,652,103 A | 3/1972 | Higgs | |
| 4,037,882 A | 7/1977 | Taylor | |
| 4,093,900 A | 6/1978 | Plunkett | |
| 4,242,668 A | 12/1980 | Herzog | |
| 4,577,880 A * | 3/1986 | Bianco | 280/33.994 |
| 4,591,175 A | 5/1986 | Upton et al. | |
| 4,629,036 A | 12/1986 | Choy | |
| 4,742,857 A | 5/1988 | Gandhi | |
| 4,748,395 A * | 5/1988 | Reynolds | 320/123 |
| 4,772,880 A | 9/1988 | Goldstein et al. | |
| 4,849,735 A | 7/1989 | Kirtley et al. | |
| 4,868,544 A | 9/1989 | Havens | |
| 4,926,161 A | 5/1990 | Cupp | |
| 4,973,952 A | 11/1990 | Malec et al. | |
| 5,000,297 A | 3/1991 | Shaw et al. | |
| 5,036,935 A | 8/1991 | Kohara | |
| 5,053,692 A | 10/1991 | Craddock | |
| 5,053,768 A | 10/1991 | Dix, Jr. | |
| 5,068,654 A | 11/1991 | Husher | |
| 5,072,956 A | 12/1991 | Tannehill | |
| 5,115,159 A | 5/1992 | Takamiya et al. | |
| 5,194,844 A | 3/1993 | Zelda | |
| 5,250,789 A | 10/1993 | Johnsen | |
| 5,283,550 A | 2/1994 | MacIntyre | |
| 5,287,266 A | 2/1994 | Malec et al. | |
| 5,315,290 A * | 5/1994 | Moreno et al. | 340/568.5 |
| 5,318,144 A | 6/1994 | Berlinger, Jr. | |
| 5,357,182 A | 10/1994 | Wolfe et al. | |
| 5,382,854 A * | 1/1995 | Kawamoto et al. | 310/67 R |
| 5,394,962 A | 3/1995 | Gray | |
| 5,402,106 A | 3/1995 | DiPaolo et al. | |
| 5,406,271 A | 4/1995 | Sonnendorfer et al. | |
| 5,426,561 A | 6/1995 | Yen et al. | |
| 5,432,412 A * | 7/1995 | Harris et al. | 318/3 |
| 5,434,781 A | 7/1995 | Alofs et al. | |
| 5,438,319 A | 8/1995 | Zeytoonjian et al. | |
| 5,485,520 A | 1/1996 | Chaum et al. | |
| 5,491,670 A | 2/1996 | Weber | |
| 5,525,967 A | 6/1996 | Azizi et al. | |
| 5,572,108 A | 11/1996 | Windes | |
| 5,574,469 A | 11/1996 | Hsu | |
| 5,576,691 A * | 11/1996 | Coakley et al. | 340/568.5 |
| 5,580,093 A * | 12/1996 | Conway | 280/816 |
| 5,586,050 A | 12/1996 | Makel et al. | |
| 5,598,144 A * | 1/1997 | Lace | 340/568.5 |
| 5,600,191 A | 2/1997 | Yang | |
| 5,607,030 A * | 3/1997 | Swift et al. | 188/1.12 |
| 5,640,146 A | 6/1997 | Campana, Jr. | |
| 5,646,616 A | 7/1997 | Komatsu | |
| 5,719,555 A | 2/1998 | Zeytoonjian et al. | |
| 5,745,036 A | 4/1998 | Clare | |
| 5,806,862 A | 9/1998 | Merryman et al. | |
| 5,818,134 A | 10/1998 | Yang et al. | |
| 5,821,513 A | 10/1998 | O'Hagan et al. | |
| 5,821,856 A * | 10/1998 | Lace | 280/297 |
| 5,831,530 A * | 11/1998 | Lace et al. | 340/568.5 |
| 5,949,331 A | 9/1999 | Schofield et al. | |
| 6,002,348 A | 12/1999 | Greene et al. | |
| 6,008,546 A | 12/1999 | Sage | |
| 6,024,655 A | 2/2000 | Coffee | |
| 6,037,869 A * | 3/2000 | Lace | 340/568.5 |
| 6,100,615 A * | 8/2000 | Birkestrand | 310/75 C |
| 6,102,414 A | 8/2000 | Schweninger | |
| 6,123,259 A | 9/2000 | Ogasawara | |
| 6,125,972 A | 10/2000 | French et al. | |
| 6,127,927 A * | 10/2000 | Durban et al. | 340/568.5 |
| 6,138,912 A | 10/2000 | Mitsuno | |
| 6,161,849 A * | 12/2000 | Schweninger | 280/33.994 |
| 6,173,817 B1 | 1/2001 | Gray | |
| 6,181,253 B1 | 1/2001 | Eschenbach et al. | |
| 6,187,471 B1 | 2/2001 | McDermott et al. | |
| 6,204,772 B1 | 3/2001 | DeMay et al. | |
| 6,217,398 B1 | 4/2001 | Davis | |
| 6,232,884 B1 | 5/2001 | Gabbard | |
| 6,353,388 B1 * | 3/2002 | Durban et al. | 340/568.5 |
| 6,355,996 B1 * | 3/2002 | Birkestrand | 310/54 |
| 6,362,728 B1 * | 3/2002 | Lace et al. | 340/426.11 |
| 6,374,955 B1 | 4/2002 | Gray | |
| 6,398,395 B1 * | 6/2002 | Hyun | 362/500 |
| 6,424,115 B1 | 7/2002 | Holl et al. | |
| 6,446,005 B1 | 9/2002 | Bingeman et al. | |
| 6,481,518 B1 * | 11/2002 | Wu | 180/65.6 |
| 6,502,669 B1 * | 1/2003 | Harris | 188/1.12 |
| 6,529,164 B1 | 3/2003 | Carter | |
| 6,597,136 B2 | 7/2003 | Burton et al. | |
| 6,650,242 B2 | 11/2003 | Clerk | |
| 6,717,511 B2 | 4/2004 | Parker et al. | |
| 6,739,675 B1 | 5/2004 | Scharpf et al. | |
| 6,744,356 B2 | 6/2004 | Hamilton et al. | |
| 6,774,503 B1 * | 8/2004 | Chen | 290/1 R |
| 6,784,800 B2 | 8/2004 | Orzechowski | |
| 6,868,318 B1 | 3/2005 | Cawthorne et al. | |
| 6,894,614 B2 | 5/2005 | Eckstein et al. | |
| 6,911,908 B1 | 6/2005 | Beart | |
| 6,928,343 B2 | 8/2005 | Cato | |
| 6,945,366 B2 * | 9/2005 | Taba | 188/1.12 |
| 6,971,464 B2 | 12/2005 | Marino et al. | |
| 6,974,399 B2 * | 12/2005 | Lo | 475/5 |
| 7,053,823 B2 | 5/2006 | Cervinka et al. | |
| 7,061,749 B2 | 6/2006 | Liu et al. | |
| 7,084,765 B2 | 8/2006 | Clapper | |
| 7,087,029 B2 * | 8/2006 | Friedland | 601/72 |
| 7,087,327 B2 | 8/2006 | Pearson | |
| 7,183,910 B2 | 2/2007 | Alvarez et al. | |
| 7,199,709 B2 | 4/2007 | Parsons | |
| 7,218,225 B2 | 5/2007 | Wieth et al. | |
| 7,239,965 B2 | 7/2007 | Wehrlen et al. | |
| 7,277,010 B2 | 10/2007 | Joao | |
| 7,353,089 B1 | 4/2008 | McEvoy | |
| 7,392,872 B2 * | 7/2008 | Chiu et al. | 180/65.5 |
| 7,397,373 B2 | 7/2008 | Hunt | |
| 7,420,301 B2 | 9/2008 | Veny et al. | |
| 7,658,247 B2 | 2/2010 | Carter | |
| 7,870,916 B2 | 1/2011 | Carter | |
| 7,944,368 B2 | 5/2011 | Carter et al. | |
| 8,046,160 B2 | 10/2011 | Carter et al. | |
| 8,463,540 B2 | 6/2013 | Hannah et al. | |
| 8,674,845 B2 | 3/2014 | Carter et al. | |
| 2001/0008191 A1 | 7/2001 | Smith et al. | |
| 2001/0028301 A1 | 10/2001 | Geiger et al. | |
| 2002/0167916 A1 | 11/2002 | Clapper | |
| 2002/0175825 A1 | 11/2002 | Clerk et al. | |
| 2002/0196151 A1 | 12/2002 | Troxler | |
| 2003/0085064 A1 | 5/2003 | Turner | |
| 2003/0102969 A1 | 6/2003 | Parsons | |
| 2003/0206102 A1 | 11/2003 | Joao | |
| 2004/0102896 A1 | 5/2004 | Thayer et al. | |
| 2004/0230370 A1 | 11/2004 | Tzamaloukas | |
| 2005/0027443 A1 | 2/2005 | Cato | |
| 2005/0060069 A1 | 3/2005 | Breed et al. | |
| 2005/0138077 A1 | 6/2005 | Michael et al. | |
| 2005/0155824 A1 * | 7/2005 | Taba | 188/19 |
| 2005/0259240 A1 | 11/2005 | Goren | |
| 2005/0275513 A1 | 12/2005 | Grisham et al. | |
| 2005/0279589 A1 | 12/2005 | Gray | |
| 2006/0067226 A1 | 3/2006 | Chandra et al. | |
| 2006/0136303 A1 | 6/2006 | Bell et al. | |
| 2006/0244588 A1 | 11/2006 | Hannah et al. | |
| 2006/0247847 A1 | 11/2006 | Carter et al. | |
| 2006/0249320 A1 * | 11/2006 | Carter et al. | 180/65.5 |
| 2007/0045018 A1 | 3/2007 | Carter et al. | |
| 2007/0045019 A1 | 3/2007 | Carter et al. | |
| 2007/0104981 A1 | 5/2007 | Lam et al. | |
| 2007/0225879 A1 | 9/2007 | French et al. | |
| 2008/0066979 A1 * | 3/2008 | Carter | 180/65.5 |
| 2008/0316059 A1 | 12/2008 | Hannah et al. | |
| 2009/0002160 A1 | 1/2009 | Hannah et al. | |
| 2009/0002172 A1 | 1/2009 | Hannah et al. | |

(56) References Cited

U.S. PATENT DOCUMENTS

| | | |
|---|---|---|
| 2011/0279252 A1 | 11/2011 | Carter et al. |
| 2012/0035823 A1 | 2/2012 | Carter et al. |

FOREIGN PATENT DOCUMENTS

| | | |
|---|---|---|
| GB | 2391098 A | 1/2004 |
| WO | WO 98-44362 | 10/1998 |
| WO | WO 01/27891 A1 | 4/2001 |
| WO | WO 2004/031017 | 4/2004 |
| WO | WO 2005/118992 | 12/2005 |
| WO | WO 2006/102300 | 9/2006 |
| WO | WO 2006/102561 | 9/2006 |
| WO | WO 2007/025267 | 3/2007 |
| WO | WO 2007/110571 | 10/2007 |
| WO | WO 2007/110572 | 10/2007 |
| WO | WO 2007/110573 | 10/2007 |
| WO | WO 2008/007050 | 1/2008 |

OTHER PUBLICATIONS

2004 Sales presentation of Gatekeeper Systems, Inc. For its Purchek™ push-out prevention system.

Press release dated Apr. 28, 2005, titled "Purchek™—a Trolley-based Anti-theft Solution from Gatekeeper Garners Huge Attention at the 2005 Retail Middle East Exhibition."

International Search Report and Written Opinion for PCT Application No. PCT/US06/10686 mailed on Aug. 31, 2007.

Notice of Allowance for U.S. Appl. No. 11/524,064, dated Sep. 24, 2009.

International Search Report and Written Opinion for PCT Application No. PCT/US06/36610 mailed on Nov. 21, 2007.

International Preliminary Report on Patentability for Int'l Appl. No. PCT/US06/36610, dated Apr. 2, 2009.

Notice of Allowance for U.S. Appl. No. 12/684,687, dated Sep. 13, 2010.

Office Action in corresponding Chinese Application No. 200680013809.1, issued Mar. 10, 2010, 18 pages.

Office Action in corresponding Chinese Application No. 200680013809.1, issued Sep. 9, 2010, 3 pages.

International Preliminary Report on Patentability for International Application No. PCT/US2006/010686, mailed Oct. 4, 2007, 9 pages.

International Search Report and Written Opinion for PCT Application No. PCT/US06/10686, dated Aug. 31, 2007.

\* cited by examiner

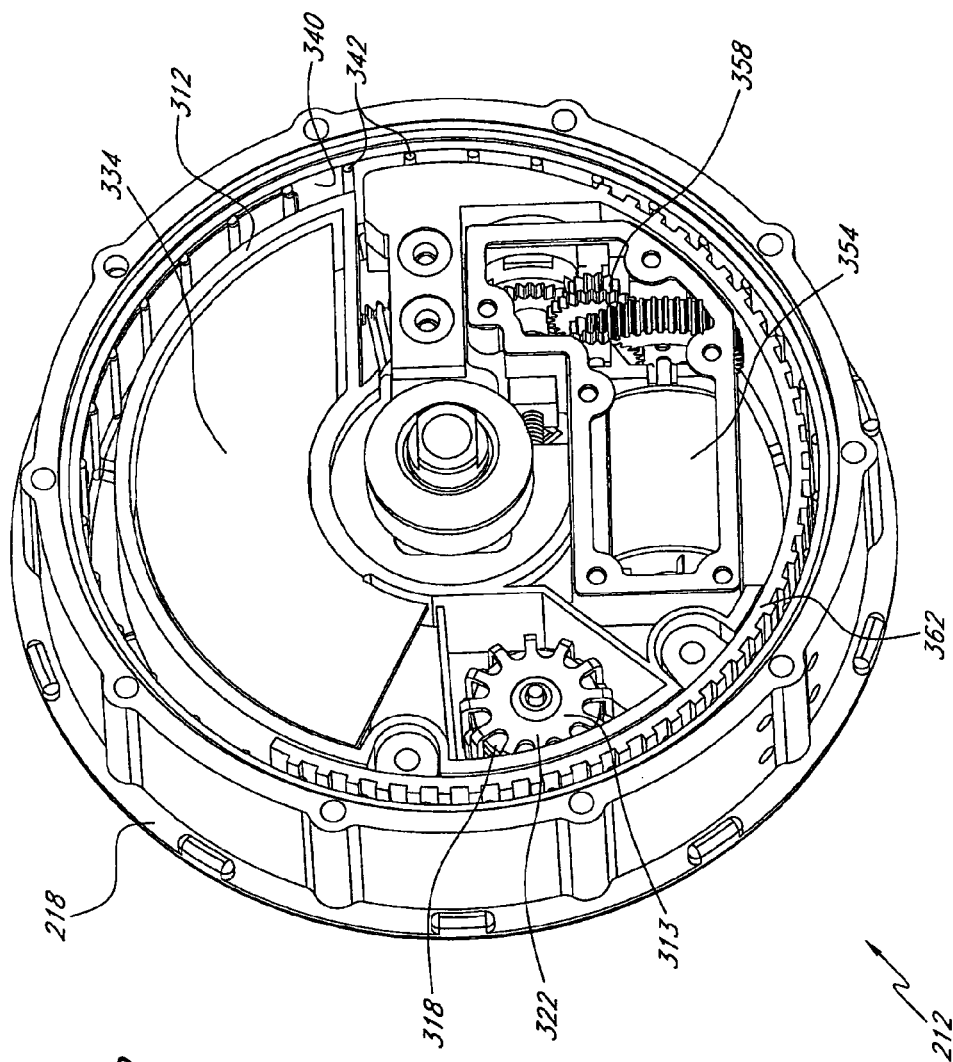

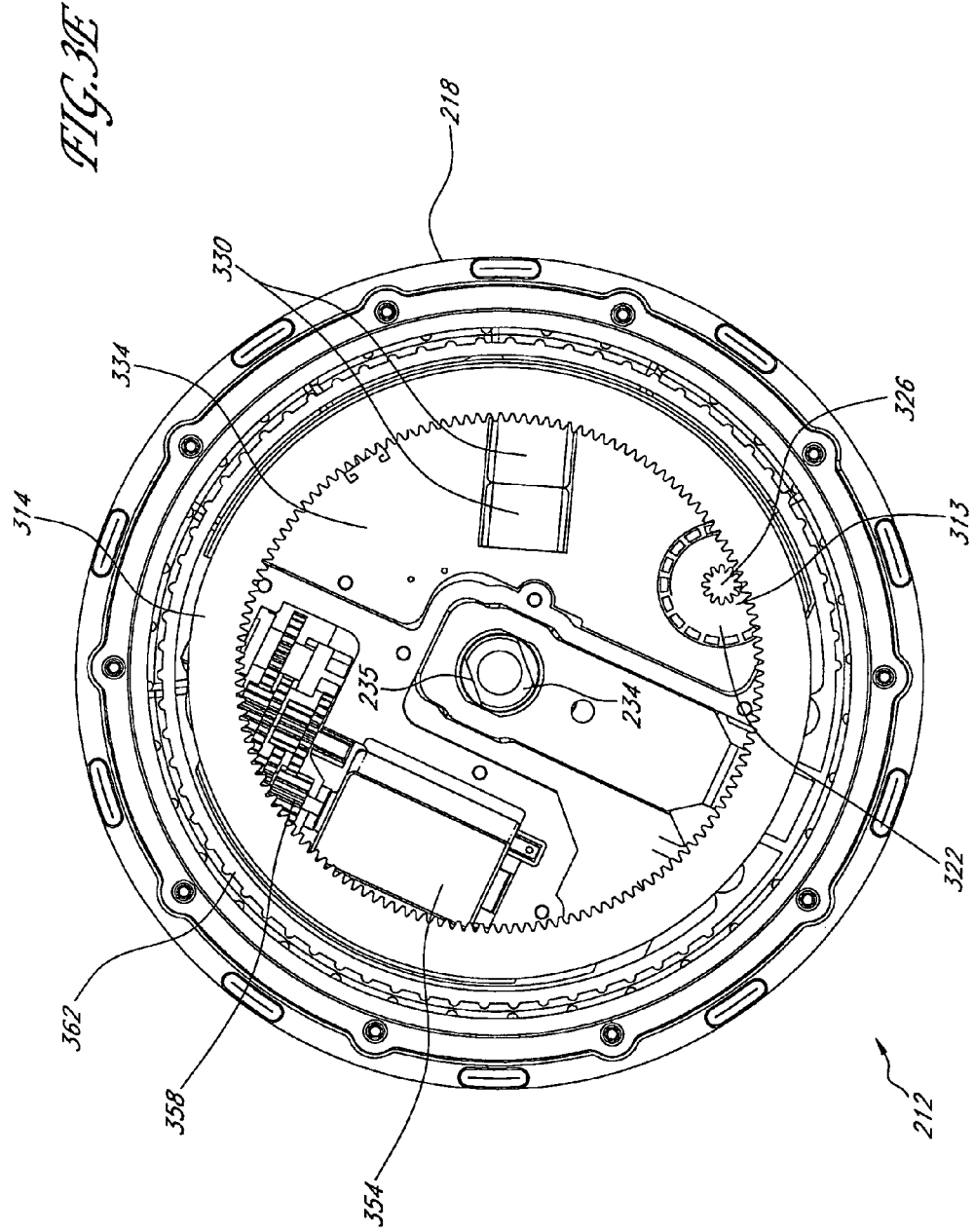

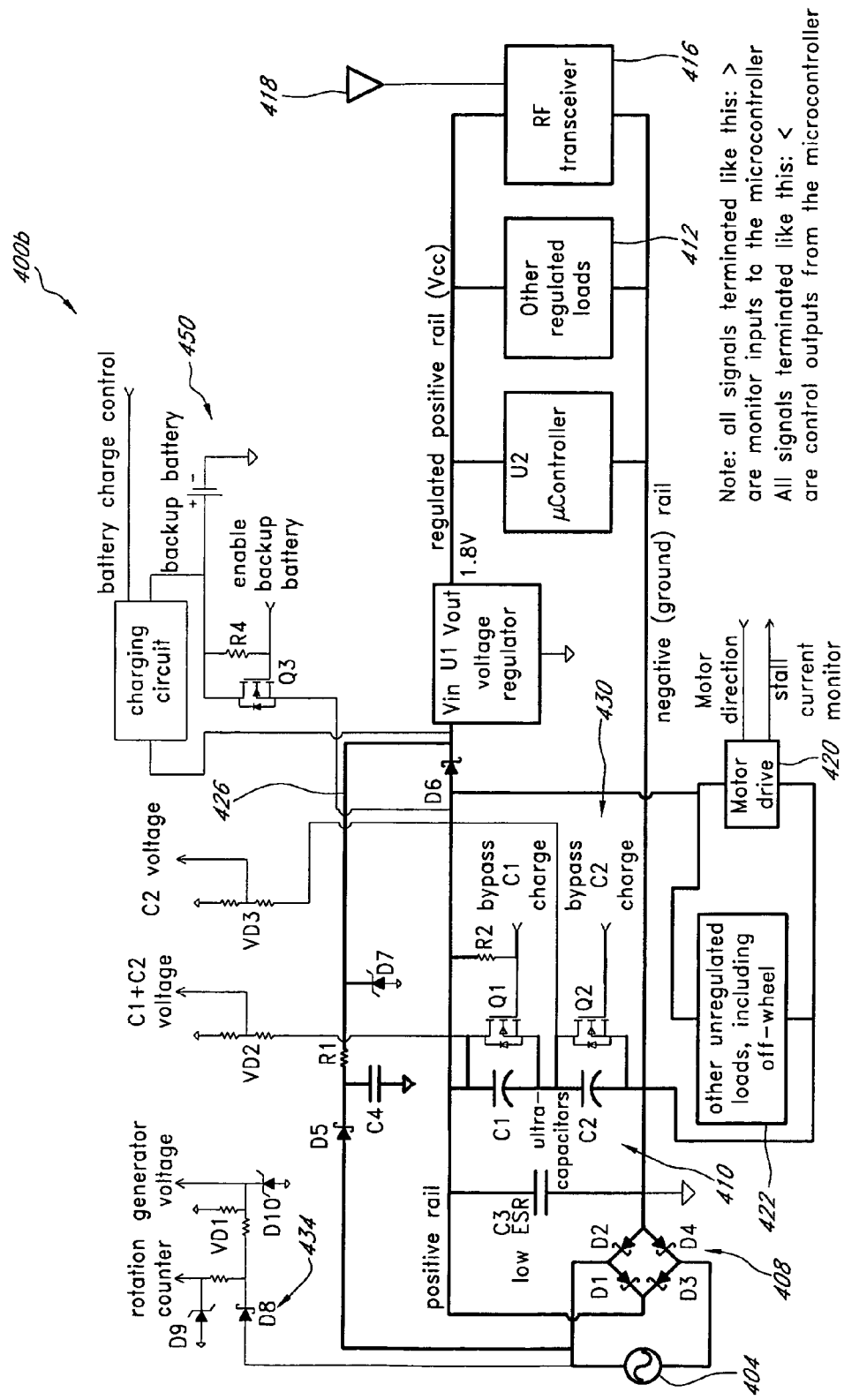

POWER GENERATION SYSTEMS AND METHODS FOR WHEELED OBJECTS

RELATED APPLICATIONS

This application claims the benefit under 35 U.S.C. §119 (e) of U.S. Provisional Patent Application Nos. 60/663,147, 60/663,327, and 60/663,195, all filed on Mar. 18, 2005, the disclosures of which are hereby incorporated by reference. This application is being filed concurrently with the following non-provisional applications, the disclosures of which are additionally hereby incorporated by reference: U.S. patent application Ser. No. 11/277,027, filed Mar. 20, 2006, titled NAVIGATION SYSTEMS AND METHODS FOR WHEELED OBJECTS (hereinafter "the Navigation Patent Application"), and U.S. patent application Ser. No. 11/277,016, filed Mar. 20, 2006, titled TWO-WAY COMMUNICATION SYSTEM FOR TRACKING LOCATIONS AND STATUSES OF WHEELED VEHICLES (hereinafter "the Two-Way Communication Patent Application").

BACKGROUND

1. Field

The present disclosure relates to electric power generation systems. More particularly the disclosure relates to systems and methods for storage and management of electric power generated from the rotational motion of a wheeled object.

2. Description of the Related Art

Wheeled vehicles are used for many purposes, for example, to transport objects or people. Often, vehicles include one or more on-board systems, devices, or components requiring a power source in order to operate. For example, the vehicle may include electronics and electrical circuitry, lighting systems, navigation systems, communication systems, etc. In addition, these systems may interact with other on-board electrical components including, for example, computers, processors, input/output devices, transceivers, lights, brakes, and many other devices.

Power sources used to provide power to on-board systems in vehicles include, for example, motors, engines, battery systems, solar cells, and the like. However, such power sources have disadvantages. For example, motors and engines are often heavy, noisy, and may require refueling from an exogenous source. Motors and engines are often not suitable for indoor use. Battery systems can discharge, which requires the battery to be replaced or recharged. Solar cells may provide insufficient power indoors or at night. Moreover, many vehicles such as, for example, a push-cart or a pull-cart, are propelled by a person and using the above power sources disadvantageously adds additional weight and takes up usable space on the vehicle.

SUMMARY

A power generation system for wheeled objects comprises a generator mechanically coupled to one or more of the object's wheels to convert wheel rotational energy into electrical energy. The power generation system may comprise an electrical storage device configured to store the electrical power produced by the generator. Power from the generator and/or the electrical storage device can be used to provide power to other electrical systems in or on the object. In certain preferred embodiments, the electrical storage device comprises a bank of high-capacity capacitors connected in series. Some embodiments use a control circuit, for example, to regulate the charging and discharging of the capacitor bank and to provide suitable voltages for other systems. In some embodiments, the power generation system is configured to be disposed within the object's wheel.

In a preferred embodiment, the rotational motion of the wheel is communicated to an AC generator disposed (in whole or in part) in the wheel. In certain embodiments, the capacitor bank comprises one or more high energy density ultracapacitors, some or all of which may have capacitances above 1 Farad (F). Some or all of the capacitor bank may be disposed in the wheel. In some embodiments suitable for use on carts (e.g., shopping carts), the generator is configured to charge the capacitor bank to a suitable working voltage (e.g., from about 2 V to about 5 V) after the wheel has traveled a distance in the range from about 10 m to about 30 m.

BRIEF DESCRIPTION OF THE DRAWINGS

These and other features of the invention(s) will now be described with reference to the following drawings illustrating certain preferred embodiments.

FIG. 3B is a perspective front view of the hub of the wheel shown in FIG. 3A with the control circuitry in place.

FIG. 3E is a cross-section view of another embodiment of a wheel comprising a power system and a brake system.

FIG. 5B is a circuit diagram of another embodiment of a control circuit including an optional backup power source.

DETAILED DESCRIPTION OF CERTAIN PREFERRED EMBODIMENTS

I. Overview

Figure 1:
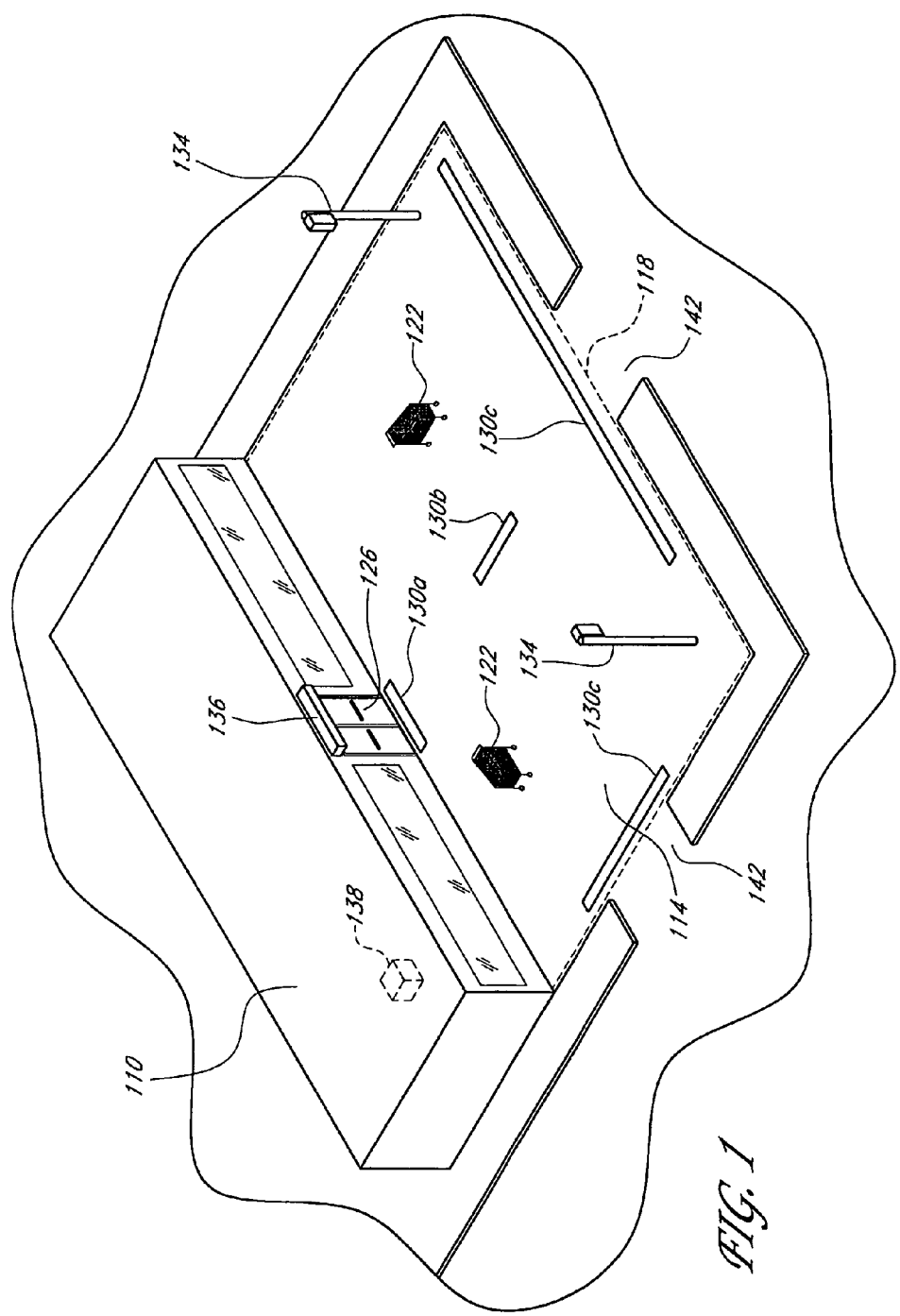
FIG. 1 is a perspective view of a retail store and associated property, illustrating shopping carts that use a wheel power generation system to provide electrical power to other systems disposed on the carts.

Various embodiments of the present invention provide systems and methods for power generation, storage, and management for a wheeled object. In certain embodiments, the wheeled object has one, two, three, four, or more wheels. The wheeled object includes, but is not limited to, a vehicle, a cart, a carrier, a transport, a gurney, a carriage, a wagon, a stroller, a wheelchair, a hospital bed, a pharmacy cart, a walker, carts used for medical and other equipment, or any other suitable conveyance. In certain preferred embodiments, the wheeled object is a shopping cart, a warehouse cart, an industrial cart, a luggage cart, or a baggage cart. In some embodiments, the wheeled object is self-propelled, while in other embodiments, the wheeled object requires an outside source, such as a person, to move the object. Accordingly, the various inventive features described herein are applicable to a wide range of different types of wheeled objects and vehicles.

As the wheeled object moves, its wheels rotate. As is well known, a rotating wheel contains mechanical energy in the form of rotational energy. Accordingly, this disclosure advantageously provides embodiments of systems and methods that are configured to convert a portion of the wheel's rotational energy into electrical energy that can be used to power other systems, components, and devices on the object. In addition, certain embodiments beneficially provide systems and methods for electrical power storage and management.

In some embodiments, a portion of the rotational energy of the wheel is converted into electrical power by a generator. As used herein, the term "generator" is a broad term, and is used in its ordinary sense, and includes without limitation, unless explicitly stated, an apparatus that converts mechanical energy into electromagnetic energy. A generator includes, but is not limited to, a dynamo or an alternator. A generator may produce a direct current (DC) and/or an alternating current (AC). Mechanical energy includes, but is not limited to, kinetic energy, and in some embodiments, rotational kinetic energy. In certain preferred embodiments, a generator produces electrical power from a portion of the mechanical energy of one or more rotating wheels.

As is well known, generators typically produce electricity through relative motion between one or more magnets and one or more coils comprising wire windings. According to Faraday's law, the relative motion between a magnet and a coil induces electricity (e.g., voltage and/or current). For example, embodiments of generators often comprise a rotating portion (a rotor) and a stationary portion (a stator). The rotor is configured so that a source of mechanical energy causes the rotor to move (e.g., rotate) relative to the stator. The motion of one or more magnets disposed on the rotor induces electrical power in the windings disposed on the stator. In other embodiments, the magnets are disposed on the stator, and the coils are disposed on the rotor. The generator may be configured so that the rotor turns within the stator, or the stator may be disposed within the rotor. The magnets can be permanent magnets and/or electromagnets. Many generator variations are possible, as is well known in the electrical arts.

In embodiments adapted for use in wheeled objects, one or more generators are disposed in or on the object and mechanically coupled to one or more wheels so that electrical power is generated when the wheels turn. In certain preferred embodiments, the generator is sized and shaped so that portions of it can fit within the wheel as further described herein. Many types of commercially available generators can be used with the systems and methods disclosed herein.

The generator can be configured to provide an AC current and/or a DC current, in various embodiments. For example, some embodiments of the power system include one or more rectification circuits to convert an AC current into a DC current usable by other systems. In other embodiments, the generator is configured to produce a DC current by using, for example, a commutator, brushes, and/or slip rings In certain embodiments, the generator is electrically coupled to an electrical energy storage device, which stores the electrical energy for use when the generator is not producing electricity. The electrical storage device can comprise one or more capacitors, rechargeable batteries, or other suitable devices for storing electrical energy. In some embodiments, the electrical storage device comprises one or more capacitors having a high capacitance, a high energy density, and/or a high power density. Such high-capacity capacitors are commonly known as ultracapacitors (or supercapacitors) and can store relatively large amounts of electrical energy. As used herein, the term "ultracapacitor" is a broad term, and is used in its ordinary sense, and includes without limitation, unless explicitly stated, any capacitor having a high capacitance, high energy density, and/or high power density. Ultracapacitors include capacitors having capacitances greater than about 0.1 F, and in particular, greater than about 1 F. Ultracapacitors include capacitors having an energy density above about 0.1 Watt-hour/kg, and/or power densities above about 5 Watts/kg. An ultracapacitor includes, for example, a supercapacitor, an electric double layer capacitor (EDLC), and an aerogel capacitor.

Other systems disposed in or on the object can be configured to use the electrical energy generated by the generator and stored in the electrical storage device during times when the object's wheels are not rotating (e.g., when the generator is not providing power). In some embodiments, these systems are disposed substantially within the wheel, and/or they may be distributed throughout the object. Electrical power can be provided by disposing wired connections between these systems and the generator and/or the electrical storage device. In some embodiments, the electrical storage device comprises a backup power system such as, for example, a backup battery system (which may comprise disposable and/or rechargeable batteries), from which power can be drawn if the ultracapacitors discharge.

Embodiments of the power system additionally comprise control circuitry that provides rapid and efficient charging of the energy storage device, reduces the discharge rate of the storage device, and provides one or more voltages suitable for operating other systems, among other functions.

In some preferred embodiments, the power system is disposed within a wheel of the object. However, in other embodiments, portions of the power system are disposed elsewhere in the object, for example, in a wheel assembly attaching the wheel to the object (e.g., a fork or a caster), or in a portion of the object's frame or handlebars, or in other suitable locations. The power system can be configured to supply power to systems disposed in a wheel (including, but not limited to, the wheel comprising the generator) or to systems disposed elsewhere in the object (e.g., a display mounted to the handlebars). It is recognized that that the power system can be configured in a wide variety of ways and electrically coupled to many types of systems.

II. Example Operating Scenario

The power system disclosed herein can be used in any wheeled device and can be configured to provide power to any type of system or systems on the object. For purposes of illustration, an example scenario will now be discussed that illustrates some of the features and advantages of the power system. This example scenario is intended to facilitate understanding of certain embodiments of the power system and uses of the power system and is not intended to limit the scope of the principles disclosed herein.

In the sample scenario shown in FIG. 1, a retail store 110 implements a loss prevention system to reduce the theft of shopping carts 122 from a tracking area 114. The tracking area 114 may comprise, for example, a portion of a parking lot adjacent to the store 110. An objective of the loss prevention system is to prevent, or at least reduce, the unauthorized transport of carts 122 across a boundary (or perimeter) 118 of the lot 114. In one embodiment of the loss prevention system, each cart 122 may include an anti-theft system comprising, for example, an alarm or a mechanism to inhibit motion of the cart 122.

Cart motion can be inhibited, for example, by providing at least one wheel of the cart 122 with a brake mechanism configured to lock the wheel. Cart motion can be inhibited in other ways, as is known in the art. For example, the wheel braking mechanism described herein can be replaced with another type of electromechanical mechanism for inhibiting the motion of the cart, including mechanisms that cause one or more of the wheels of the cart 122 to be lifted off the ground. In some embodiments, the brake mechanism comprises a motor that drives an actuator that can engage an inner surface of the wheel so as to inhibit the motion of the wheel. In certain embodiments, the brake mechanism has an unlocked state in which the wheel can substantially freely rotate and a locked state in which the wheel's rotation is substantially impeded. In other embodiments, the brake mechanism is progressive, wherein the actuator can apply differing amounts of braking force to the wheel. A brake mechanism suitable for use with wheeled devices such as shopping carts is disclosed in U.S. Pat. No. 6,945,362, issued Sep. 20, 2005, titled "ANTI-THEFT VEHICLE SYSTEM," which is hereby incorporated by reference herein in its entirety.

To prevent loss, if the cart 122 is moved across the lot boundary 118, the anti-theft system is activated (e.g., the alarm or the brake is triggered). In some loss prevention systems, the anti-theft system is activated if the cart 122 detects a signal from an external transmitter positioned near the lot boundary 118. For example, the signal may be a VLF signal transmitted from a wire buried at the boundary 118, such as described in U.S. Pat. No. 6,127,927, issued Oct. 3, 2000, titled "ANTI-THEFT VEHICLE SYSTEM," which is hereby incorporated by reference herein in its entirety.

In some embodiments, a navigation system is used to determine the position of the cart 122 within the tracking area 114. The navigation system can be disposed on or in the cart 122 or in a central controller 138. If the navigation system determines the position of the cart 122 to be outside the lot boundary 118, the anti-theft system can be activated. In one embodiment, the navigation system begins to monitor cart position when the cart 122 leaves a store exit 126. The initial cart position is set to be the position of the exit, and the navigation system updates the position of the cart 122 by a dead reckoning algorithm. The dead reckoning algorithm uses object speed, heading, distance traveled, and elapsed time to estimate the position of the cart. Accordingly, in various embodiments, the cart 122 includes heading sensors, motion sensors, and processors. In one embodiment, the object's heading is measured with respect to the Earth's magnetic field, and the cart 122 includes magnetic field sensors to determine, e.g., the object's direction of travel with respect to geomagnetic North. To determine the cart's speed or distance traveled, one or more wheels may include rotation sensors including, for example, mechanical, optical, or magnetic rotary encoders.

In some embodiments, the navigation system is provided with the position of the lot boundary 118, for example, as a set of coordinates. By comparing the present position of the cart 122 with the position of the boundary 118, the system can determine whether the cart 122 is within the lot 114. If the navigation system determines the cart 122 is moving across the lot boundary 118, the navigation system can activate the cart's anti-theft system. In a preferred embodiment, the navigation system is sized so as to fit within a wheel of the cart 122. In other embodiments, portions of the navigation system can be disposed in a wheel, while other portions can be disposed elsewhere in the cart 122 (e.g., in handlebars or the frame). A navigation system suitable for use with a wheeled object, such as a shopping cart, is disclosed in the Navigation Patent Application.

In other embodiments, the navigation system communicates the position of the cart 122, or other information, to a central processor or the central controller 138, which determines whether the cart 122 has exited the lot 114 and whether the anti-theft system should be activated. In certain preferred embodiments, the cart 122 includes a two-way communication system that enables suitable information to be communicated between the cart 122 and the central controller 138 (or other suitable transceivers). The communication system may include one or more antennas, transmitters, receivers, transceivers, signal generators, or other components. A two-way communication system suitable for use with the navigation system is disclosed the Two-Way Communication Patent Application.

Other devices can be advantageously used by the retail store 110 in this sample scenario. For example, one or more markers 130a-130c can be disposed at various locations throughout the lot 114 to serve as reference locations, landmarks, or beacons. The markers 130a-130c can mark or otherwise indicate the position of, for example, store exits 126 (e.g., marker 130a), the perimeter of the lot 114 (e.g., markers 130c), and/or other suitable reference locations (e.g., marker 130b). In various embodiments, the markers 130a-130c communicate information to the navigation system by, for example, magnetic or electromagnetic methods. The navigation system may use information communicated from a marker 130a-130c to reduce accumulated navigational errors, to determine that a lot boundary 118 is nearby, or for other purposes. In some embodiments, one or more markers (e.g., the markers 130c) may be disposed near locations of entrances/exits 142 to the parking lot 114.

In one embodiment, one or more transmitters 134 are disposed throughout the lot 114 and are configured to transmit information to the navigation system in the carts 122. The transmitters 134, in an embodiment, also receive information (e.g., they are transceivers). In various embodiments, the markers 130a-130c (and/or the transmitters 134) communicate with the carts 122 via one-way (to or from the cart) or two-way (to and from the cart) communication protocols. For example, the markers 130 and/or transmitters 134 may be configured to use electromagnetic signals to communicate with the cart 122. These signals may include magnetic signals and/or RF or VLF signals. As used herein, RF signals comprise electromagnetic signals having frequencies below about 300 GHz, and VLF ("very low frequency") signals comprise RF signals having frequencies below about 20 kHz.

In other embodiments, one or more access points (AP) 136 are used to create two-way communication links with the carts 122. In FIG. 1, the access point 136 is shown positioned above the exit 126 of the store 110, which beneficially allows the AP to communicate with carts 122 located throughout the parking lot 114. In other implementations, more than one AP can be used, and the AP's can be located throughout the tracking area. Access points 136 can communicate with a transceiver in the cart 122 (e.g., an RF transceiver), which is connected to the navigation system (and/or other components) for purposes of retrieving, exchanging, and/or generating cart status information, including information indicative or reflective of cart position. The types of cart status information that may be retrieved and monitored include, for example, whether an anti-theft system has been activated (e.g., whether a wheel brake is locked or unlocked); whether the cart 122 is moving and in which direction; the wheel's average speed; whether the cart 122 has detected a particular type of location-dependent signal such as a VLF, EAS, RF, or magnetic signal (discussed below); whether the cart is skidding; the cart's power level; and the number of lock/unlock cycles experienced by the cart per unit time. The access points 136 can also exchange information with the navigation system related to the position of the perimeter 118. In some embodiments, the access points 136 use a received signal strength indicator (RSSI) to measure the strength of the signal received from the cart 122 to assist in determining the distance to the cart 122 and whether the cart is moving toward or away from the store 110. Further details on the implementation and use of a set of wireless access points (AP) is disclosed in the Two-Way Communication Patent Application.

The navigation system may be used by the store 110 for purposes additional to or different from loss prevention. In some embodiments, the retail store 110 may wish to gather information related to the positions and paths taken by the carts 122. For example, the retail store may wish to determine where in the lot 114 that customers leave carts 122 so as to improve cart retrieval operations. In other embodiments, the navigation system can communicate with other devices such as, for example, a mechanized cart retrieval unit.

Although the sample scenario has been described with reference to a loss prevention system for shopping carts 122 in a parking lot 114 outside a retail store 110, in some embodiments, the navigation system is configured to determine the position of a cart 122 within the store 110. For example, the system may be used to determine whether a cart 122 has passed through a checkout lane or whether the cart 122 has passed through selected aisles. In addition, the navigation system may be used to track cart positions so as to gather information related to the clustering or queuing of carts at certain locations inside or outside the store 110. Moreover, other systems may be disposed on the cart 122 including, for example, an input/output device such as a display, monitor, touchscreen, keyboard, or keypad and/or a lighting system (including, e.g., headlights, taillights, turn signals, and/or indicator lights). Further details of a handle-mounted display system that can be electrically powered by the power system disclosed herein are discussed in the Two-Way Communication Patent Application.

Accordingly, the cart 122 can include a wide variety of systems, with each system having its own power needs. For example, a motor in a brake system may require relatively high voltage, current, and power to operate, while a microcontroller system may require lower operating voltage and power. Some systems require a continuous supply of power (e.g., a navigation system, a display, or a light), while other systems use power intermittently (e.g., when a wheel brake is activated). Therefore, it is beneficial to dispose on the cart 122 a power system that can generate and store sufficient power for each of these systems.

In some embodiments, the power generation system is disposed within and provides power to one or more systems also located in the wheel. For example, in one preferred embodiment, the power generation system is disposed within a wheel and is used to power a brake system also disposed in the wheel. However, this is not a requirement, and in other embodiments, the power system is connected, for example, by electrical wires, to systems disposed elsewhere (e.g., in or on the handlebars or frame of a cart). For example, in various embodiments, the wheel power system can be used to power a display attached to the cart's handlebars, one or more lights attached to the frame, a communications system disposed in the cart's frame, and an anti-theft system (including, e.g., an alarm and/or a wheel brake, which may be disposed in a different wheel than the power system). In another preferred embodiment, the power system is used to power one or more transceivers (e.g., RF or VLF transceivers) disposed in the cart and used to communicate with other transmitters 134 or access points 136. Many variations are possible, and a skilled artisan will recognize the versatility of uses for the power system disclosed herein.

Embodiments of the above-mentioned systems may be used in other environments and contexts such as, for example, a warehouse, an industrial plant, an office building, a hospital, an airport, or other facility. Accordingly, the power systems and methods disclosed herein can be used in many different types of facilities and in many types of wheeled objects. Many variations of the sample scenario discussed above are possible without departing from the scope of the principles disclosed herein.

III. Wheel with Power Generation System

Figure 2A:
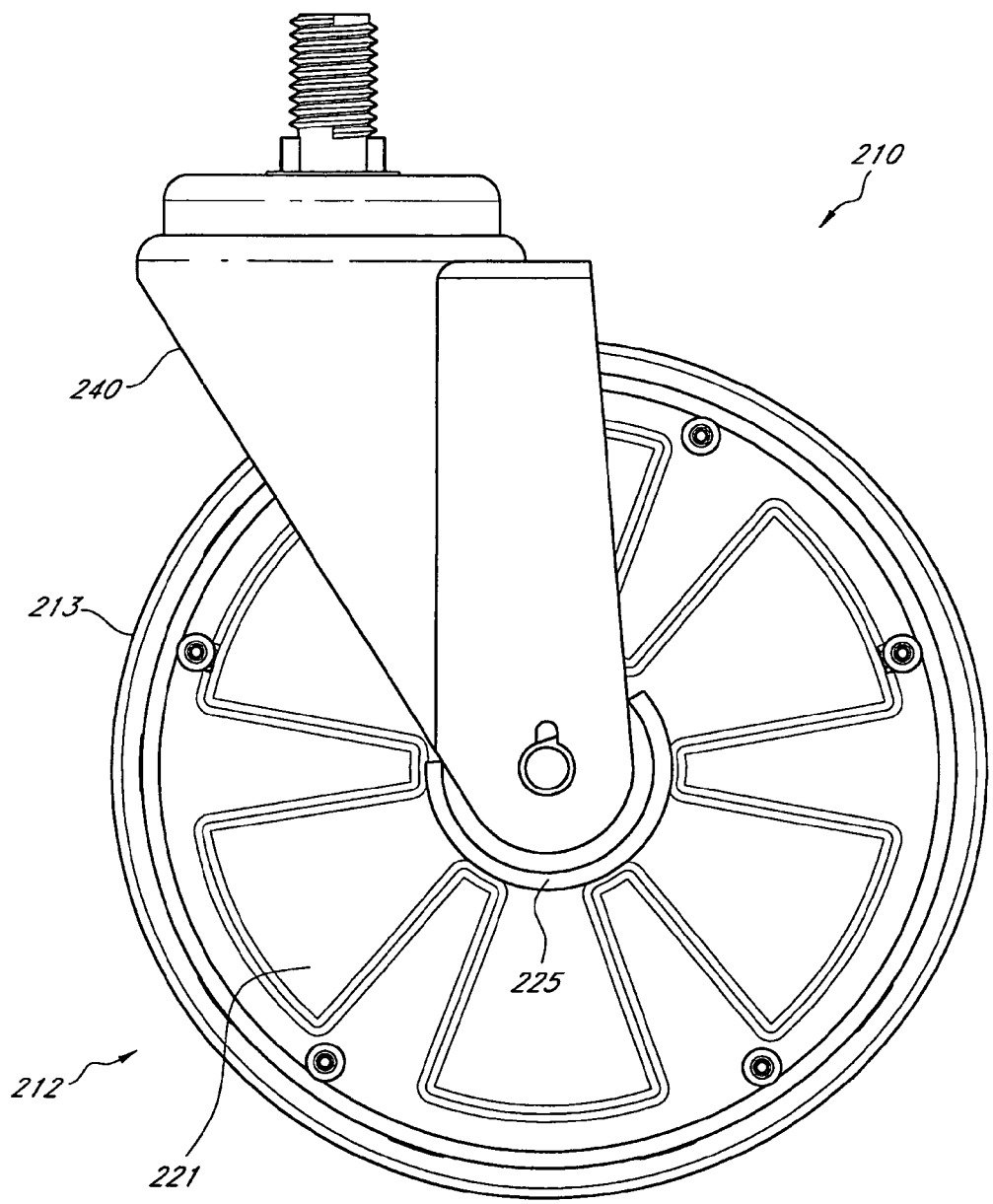
FIG. 2A is a plan-view of an embodiment of a wheel and wheel assembly that can be used on an object such as a cart.

FIG. 2 is a plan-view of an embodiment of a wheel assembly 210 comprising a wheel 212 and a caster 240 (also known as a "fork" or a "yoke"). The wheel assembly 210 is adapted to be attached to an object, such as a cart, by being screwed in to the object. The wheel assembly 210 can be used to replace one (or more) of the wheels on the object. For example, the wheel assembly 210 can replace a standard-sized front (and/or rear) wheel on a shopping cart. In certain embodiments, the wheel 212 has a diameter of about five inches, although the wheel 212 can be larger or smaller in other embodiments. The wheel 212 includes a tire 213 that is circumferentially disposed about a hub 218 (see FIGS. 3A-3C). The hub 218 rotates with the tire 213. The hub 218 can have a cover 221 that protects components disposed within the hub 218 from environmental conditions In addition, the cover 221 prevents internal components from being seen and tampered with by users of the object. The hub 218 (and the cover 221) can be fabricated from rigid, lightweight materials including plastics such as nylon or acrylonitrile butadiene styrene (ABS).

Figure 2B:
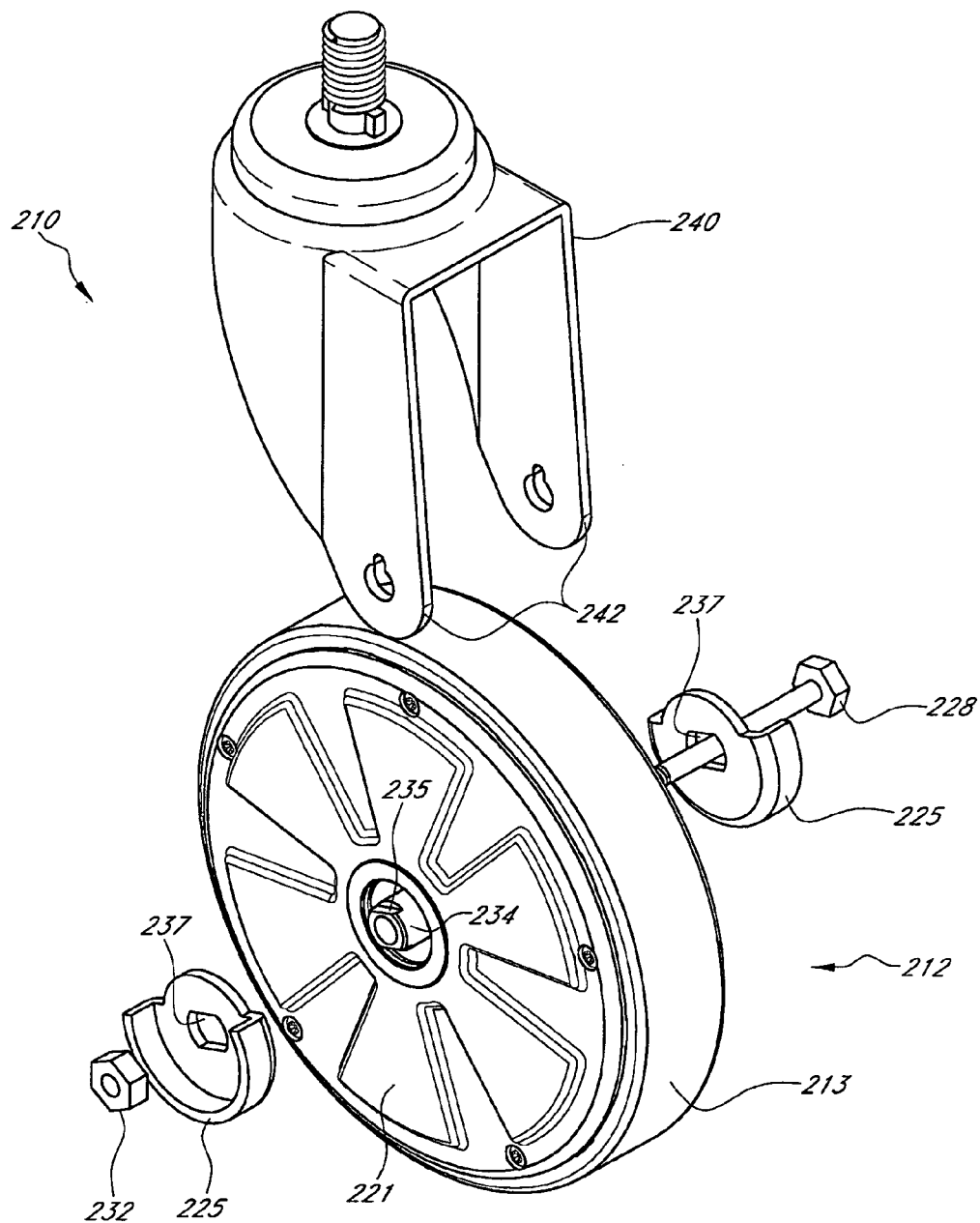
FIG. 2B is an exploded view of the wheel assembly shown in FIG. 2A.

FIG. 2B is an exploded view of the wheel assembly 210. The wheel 212 is disposed between end portions 242 of the caster 240. The end portions 242 fit into "U"-shaped retaining clips 225. A bolt 228 passes through the retaining clips 225, the end portions 242, and a hollow axle 234 in the center of the hub 218. A nut 232 is tightened to secure the wheel 212 to the caster 240. The axle 234 has flat portions 235 that engage shaped holes 237 in the retaining clips 225. The axle 234 is prevented from rotating by the interference fit between the "U"-shaped sides of the retaining clips 225 and the end portions 242 of the caster 240. Internal components disposed within the hub 218 can be prevented from rotating by attaching them to the non-rotating axle 234. The wheel 212 can be configured to contain some or all portions of other suitable systems including, for example, a power system, a navigation system, an anti-theft system, a brake system, and/or a two-way communication system.

Figure 3A:
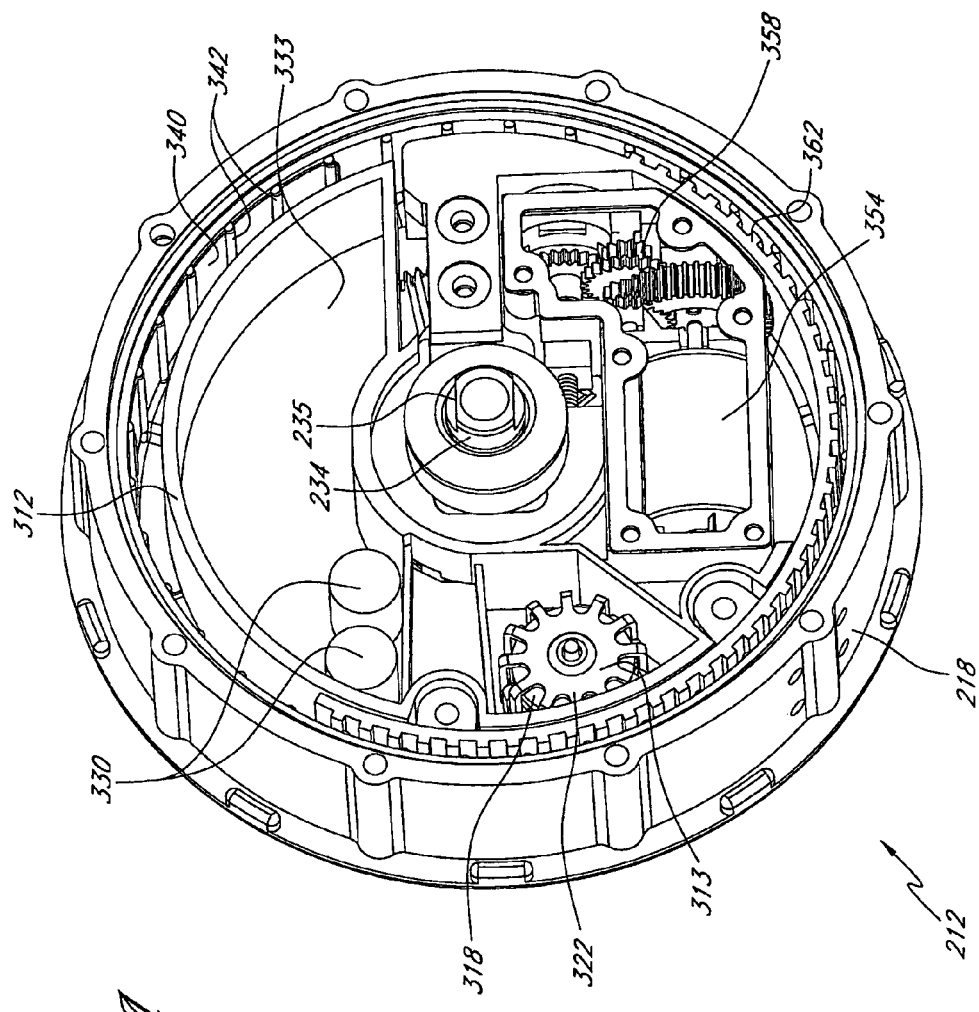
FIG. 3A is a perspective front view of the hub of the wheel with the cover and control circuitry removed.
Figure 3C:
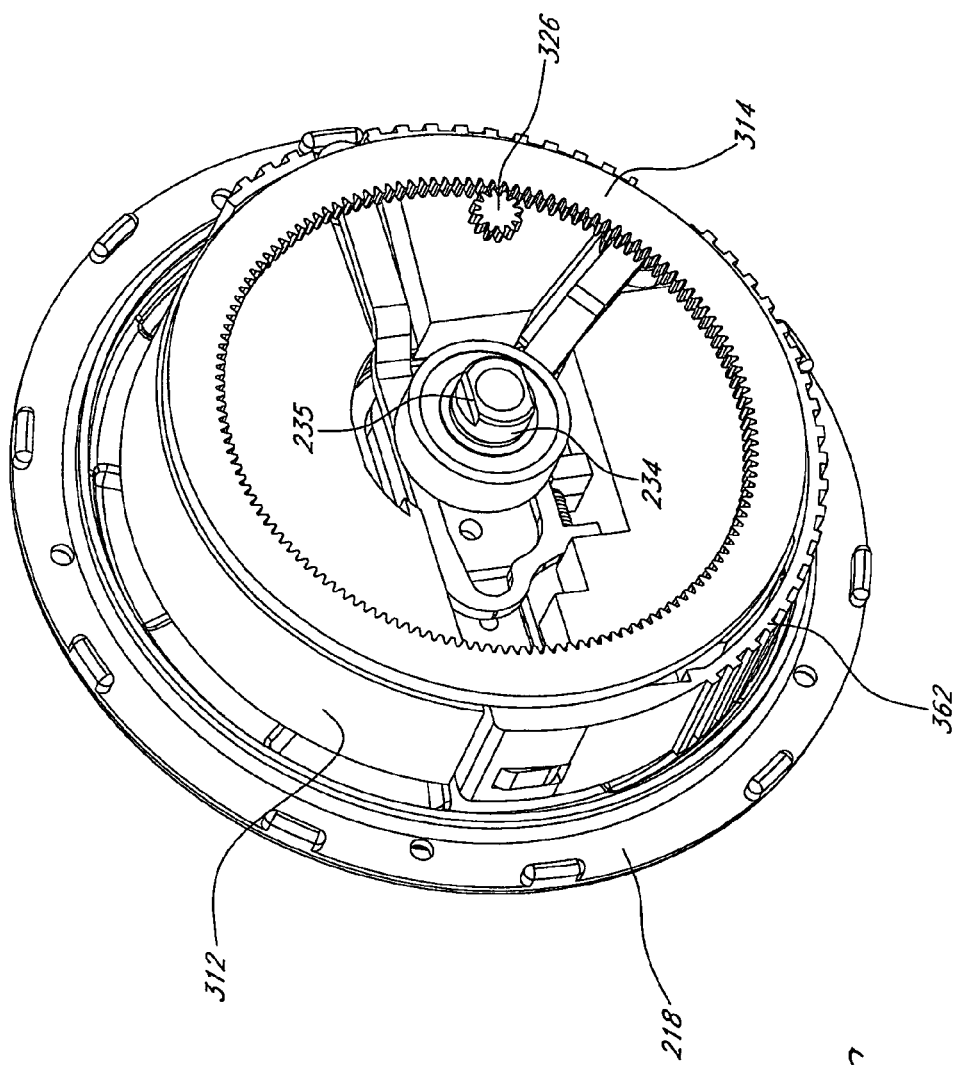
FIG. 3C is a perspective rear view of the hub of the wheel.

FIGS. 3A-3C schematically illustrate an embodiment of the wheel 212 that comprises a power system and a brake system. FIGS. 3A and 3B are front perspective views showing the arrangement in the hub 218 of internal components of the power system and the locking system. For clarity of presentation, the tire 213, which surrounds the circumference of the hub 218, and the hub's cover 221 are not shown in FIGS. 3A-3B. The internal components are prevented from rotating by attaching them to a chassis 312, which is rigidly attached to the non-rotating axle 234. In some embodiments, the chassis 312 is made from an electrically insulating material, for example, a plastic material such as nylon or ABS.

The power system comprises a generator 313, an electrical storage device 330, and control electronics. The generator 313 comprises a rotor 318 housed within a stator 322 and free to rotate therein. The generator 313 will be further described with reference to FIG. 3D. The power system control electronics can be fabricated on a printed circuit board assembly 334 (PCBA). The PCBA 334 is not shown in FIG. 3A in order to illustrate the electrical storage device 330 disposed within a cavity 333 in the chassis 312. FIG. 3B shows the PCBA 334 in place over the cavity 333.

The brake system comprises a brake motor 354, a drive mechanism 358, and a brake band 362. The brake system further comprises control electronics fabricated on the PCBA 334. In other embodiments, separate PCBA's can be used for the brake and the power system electronics. The brake motor 354 engages the drive mechanism 358 (e.g., a set of gears) to drive the brake band 362 into and out of contact with an inner surface 340 of the rotating hub 218. The brake motor 354 generally is a DC servo or stepper motor operable in a forward and a reverse direction. In some embodiments, the DC motor 354 has an operating voltage of about 5 V.

The brake system is operable between an unlocked and a locked state. In the unlocked state, the brake band 362 does not contact the hub 218, and the wheel is substantially free to rotate. In the locked state, the brake band 362 expands outward and contacts the hub 218. The inner surface 340 may include a series of protrusions 342 that engage notches in the brake band 362 to prevent rotation of the wheel 212. In other embodiments, different brake systems can be used such as, for example, the brake mechanisms disclosed in U.S. Pat. No. 5,598,144, issued on Jan. 28, 1997, entitled "ANTI-THEFT VEHICLE SYSTEM," or U.S. Pat. No. 6,945,366, issued Sep. 20, 2005, entitled "ANTI-THEFT VEHICLE SYSTEM," each of which is hereby incorporated by reference herein in its entirety. Moreover, in other embodiments a progressive brake mechanism, which provides a variable amount of braking force to the wheel 212, can be used.

FIG. 3C is a rear perspective view of the hub 218 that illustrates a mechanism that transmits the rotational motion of the wheel 212 to the generator 313. A drive gear ring 314 is attached to and rotates with the hub 218. The drive gear ring 314 engages a pinion gear 326 that is attached to the rotor 318 (see also FIG. 3D). Rotation of the wheel 212 causes the rotor 318 to rotate within the generator 313. The gear ratio between the drive gear ring 314 and the pinion gear 326 can be used to provide a suitable rotation rate for the rotor 318. In some embodiments, the gear ratio is 10:1 or 15:1, although other gear ratios can be used.

In some embodiments, the drive gear ring 314 is formed as a molded feature in a cover to the hub 218 or in the hub 218 itself. Through normal use, the drive gear ring 314 may become slightly noncircular or "out-of-round" and may not fully engage the pinion gear 326, which can lead to gear wear. Accordingly, some embodiments beneficially use secondary gearing that "floats" on the drive gear 314 and maintains solid contact with the pinion gear 326 to reduce gear wear even if the drive gear ring 314 becomes slightly noncircular.

a. Generator

Figure 3D:
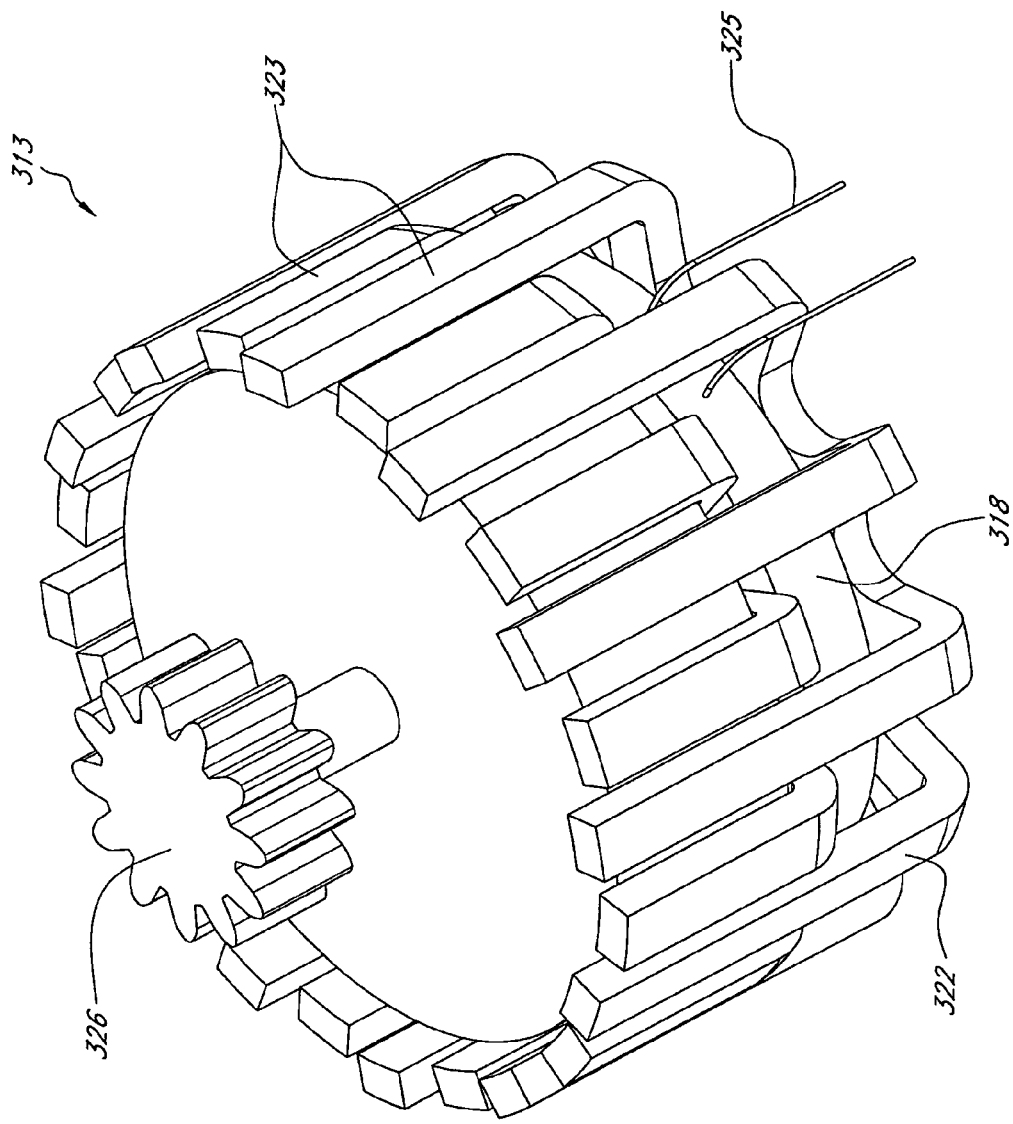
FIG. 3D is a perspective view of an embodiment of a generator sized to fit within the hub of the wheel of FIGS. 3A-3C.

FIG. 3D is a perspective view of an embodiment of the generator 313. In this embodiment, the stator 322 comprises a number of posts or legs 323 arranged in a generally cylindrical, cage-like configuration around the rotor 318. The rotor 318 is free to rotate within the stator 322 and comprises one or more generally cylindrically-shaped, magnetized disks The legs 323 of the stator 322 comprise the windings of the generator 313. Rotation of the rotor 318 within the stator 322 induces electric current to flow within the windings. The electric current is provided to other components via wires 325. For example, the wires 325 may connect the generator to the electric storage device 330 and the PCBA 334.

The generator 313 produces an AC current. In this embodiment, the generator 313 is a 24-pole generator that produces 12 cycles of electric power for each rotation of the rotor 318. In other embodiments, a different number of poles can be used. In other embodiments, the generator 313 can include brushes, slip rings, and/or commutators to provide a DC current. However, brushes, slip rings, and commutators are subject to frictional wear and impairment and require periodic adjustment or replacement. Embodiments not using these components advantageously reduce the need for generator maintenance and are particularly beneficial in environments (such as a retail store's outdoor parking lot) where the generator is subject to dirty and shock-prone conditions.

Generally, the power output of the generator 313 is roughly linearly proportional to the rotor's rotational rate. The gear ratio between the drive gear ring 314 and the pinion gear 326 can be selected so that the generator 313 produces a suitable amount of power for wheel speeds typically encountered in an implementation. For example, in an embodiment suitable for use in a retail store 110 environment (FIG. 1), the shopping cart 122 is generally moved at normal walking speeds in the range from about 1 ft/s to about 5 ft/s. The outer diameter 214 of a standard shopping cart wheel 212 is about 5 inches. Accordingly, at normal walking speeds the wheel 212 rotates in the range from about 50 revolutions per minute (rpm) to about 250 rpm. If a gear ratio of 10:1 is used, and the generator 313 has 24 poles, then one wheel rotation produces 120 cycles of electrical power. Such an embodiment of the generator 313 provides electrical power in the range from about 80 mW to about 400 mW. An embodiment of the wheel 212 having a gear ratio of 15:1 provides about 120 mW to about 600 mW of electrical power.

In the generator embodiment shown in FIG. 3D, the rotor 318 comprises a permanent magnet that rotates within the stator 322. In other embodiments, the rotor 318 and/or the stator 322 may include one or more electromagnets, which allows for variable power output from the generator 313. In such embodiments, the power output can be adjusted the power system control circuit based on, for example, charging needs, instantaneous power consumption, the electrical load fed by the generator 313, etc.

b. Electrical Storage Device

The power system includes the electrical storage device 330, which in certain embodiments, comprises one or more capacitors. For example, FIG. 3A shows an embodiment utilizing two capacitors 330. In certain preferred embodiments, capacitors having a high capacitance are selected because of their ability to store relatively large amounts of electrical energy. For example, in certain embodiments, the electrical storage device 330 comprises one or more ultracapacitors. Because some ultracapacitors have voltage limits (e.g., about 2.5 V) that are less than the voltage needed to operate certain systems on the object (e.g., a braking system), various embodiments use a bank of capacitors connected in series to provide a higher working voltage. In certain such embodiments, the capacitor bank may comprise two, three, four, five, or more capacitors. In other embodiments, the capacitor bank is connected in parallel or in series/parallel combinations.

As is well known, any real capacitor has an internal electrical resistance known as the equivalent series resistance (ESR). It is preferable, although not required, for capacitors used in the electric storage device 330 to have a low equivalent series resistance (ESR) so as to provide a high electric power discharge rate. In some embodiments, the ESR of the capacitors is less than about 1 Ohm.

In some embodiments, the electric storage device 330 comprises a series capacitor bank comprising two Cooper-Bussmann PowerStor® Aerogel Capacitors B1010-2R5155 (Cooper Electronic Technologies, Boynton Beach, Fla.), each rated at a capacitance of 1.5 F and a working voltage of 2.5 V.

This device provides a maximum working voltage of about 5 V. In another embodiment, the capacitor bank comprises three Cooper Bussmann PowerStor B0830-2R5475 1.6 F EDLC ultracapacitors connected in series to produce a 7.5 V maximum working voltage and a nominal ESR of about 0.45 Ohms. In different embodiments, different numbers of ultracapacitors can be used. Other suitable ultracapacitors include: a Maxwell Boostcap® PC10 EDLC (Maxwell Technologies, San Diego, Calif.); a Nesscap ESHSR-0003C0-002R7 EDLC (Nesscap Corp., Kyongg-Do, Korea); an Eppscore AC1020 ultracapacitor (Eppscore Corp., Seoul, Korea); and an EPCOS B49100A1104M00 ultracapacitor (EPCOS AG, Munich, Germany).

The electric storage device 330 may comprise additional electronic components, including, for example, capacitors, diodes, resistors, inductors, transistors, regulators, controllers, batteries, and any other suitable electronic device. In some embodiments, the additional electronic components assist in storing and discharging electrical energy and in directing the electrical energy to suitable systems. Although the embodiment of the storage device 330 shown in FIG. 3A comprises two ultracapacitors, this is not a limitation. For example, in some embodiments, the electric storage device 330 includes one or more batteries (disposable and/or rechargeable), one or more lower capacity capacitors, and/or one or more fuel cells. It is contemplated that the electric storage device 330 may use any type of device, component, or system configured to store electromagnetic energy, including those now existing and those to be developed in the future.

In some embodiments, the electric storage device 330 further comprises a backup battery that can be used to power various on-board systems if the capacitor bank discharges below a minimum operating voltage suitable for the on-board systems. The backup battery may comprise disposable and/or rechargeable batteries. In certain embodiments, electrical power from the generator 313 is used to charge the backup battery.

In another embodiment, the electrical storage device 330 comprises one or more Lithium Vanadium Pentoxide rechargeable batteries (e.g., Panasonic VL3032 100 mAh cells). Because the self-discharge rate of Lithium Vanadium Pentoxide batteries (about 2% per year at room temperature) is significantly lower than the self-discharge rate of many commercially available EDLC's, this embodiment may beneficially be used in implementations that have low power needs and long term energy storage needs after the generator stops producing electricity (e.g., when the wheel stops rotating).

Lithium Vanadium Pentoxide batteries have different electrical characteristics compared to ultracapacitors. For example, they have lower energy capacity (e.g. for a Panasonic VL3032, 100 mAh*2.7 V=0.27 Joules compared to many Joules for most commercially available ultracapacitors), lower current, and relatively slow charging rate (4 mA). Accordingly, implementations using Lithium Vanadium Pentoxide batteries rather than ultracapacitors will generally also have low energy capacity, current, and charging rate requirements.

In another embodiment, the electrical storage device 330 comprises two or more devices utilizing different energy storage technologies, e.g., an ultracapacitor and a Lithium Vanadium Pentoxide battery. This embodiment may advantageously be used in an implementation where there is a need for significant current (e.g. greater than about 200 μA) in a time and motion profile which meets the ultracapacitor discharge profile (e.g., no significant current is needed after a few days without charging), but where some smaller energy storage is needed on a much longer time scale (e.g., for weeks, months, or years after the wheel stops rotating).

In other embodiments, the electrical storage device 330 may comprise batteries having other types of rechargeable battery chemistry (e.g., NiMH or lithium ion). For example, the volumetric energy density of some NiMH batteries is higher than that of some ultracapacitors, and the self discharge rate is somewhat lower, which may make them suitable for some implementations. However, for most implementations, the rapid charging, high cycle count, and high available discharge current of ultracapacitors makes them a preferred embodiment for the electrical storage device.

c. Alternative Embodiments

The components of the power system and the brake system can be configured differently than shown in FIGS. 3A-3C. For example, FIG. 3E is a plan-view that schematically illustrates an alternative arrangement of the above-mentioned components within the wheel 212.

In the embodiments illustrated in FIGS. 3A-3E, all the components of the power and braking systems are contained within the wheel. However, in other embodiments, some or all of these components can be disposed outside the wheel 212. For example, some or all of the components can be disposed in an enclosed plastic housing that forms part of the wheel assembly or caster. In embodiments suitable for carts, some or all of the components can be disposed in or on the frame or the handlebars of the cart. In some embodiments, the power system and the brake system are disposed in different locations in the object. For example, the brake system can be disposed in a first wheel and the power system can be disposed in a second wheel. As will be recognized, there are many possible variations for the configuration and layout of the power system and braking system.

d. Powering Off-Wheel Systems

The power system can provide power to systems and components both inside the wheel ("in-wheel" systems) and outside the wheel ("off-wheel" systems). FIGS. 3A-3E illustrate embodiments wherein the power system provides power to an in-wheel system (e.g., the brake system).

However, in other embodiments, systems such as a navigation system or a two-way communications system may be disposed in other places on the object (including in a different wheel than the power system). For example, in some preferred embodiments, a display, monitor, or other suitable input/output device (e.g., audio speakers and/or a microphone) is mounted to a portion of the object such as, for example, a handle on a shopping cart. The display may include a display screen, such as a touch screen, that is viewable by a person pushing the object. The display can be used to display information received from other systems on the object (e.g., a navigation system, a two-way communication system, an anti-theft system, etc.). For example, the display may show a graphic illustrating the position of the object within a facility. The display may be connected to other controllers, processors, and/or transceivers and configured to output additional information. In embodiments suitable for a retail store, the display may have a card reader or wand that enables customer to swipe a customer loyalty card or another type of card that identifies the customer. In these embodiments, a transceiver on the object may be configured to convey the customer identifier (as well as position information from a navigation system) to a remote transceiver (or an access point) such that this identifier (and position information) can be associated with other information received from the cart during the customer's shopping session. Further information related to tracking the locations and monitoring the status of objects (such as shopping carts) is disclosed in the Two-Way Communication Patent Application and further information related to determining the position of an object is disclosed in the Navigation Patent Application. The power system disclosed herein can be used to power such a handle-mounted display.

In certain embodiments, the power system uses an electrically split axle to transmit electrical power from the wheel to other potions of the object. In the embodiment shown in FIG. 4A, power from the power system is routed to the PCBA 334 which is connected by wires 378 to the axle 234. The axle 234 comprises two electrically conductive (e.g., metal) pieces 234a and 234b that are press fit with a first insulating spacer 374a between them to keep the wires 378 from shorting the two pieces 234a, 234b together. The axle piece 234b has a step 280 that ensures proper spacing of the axle pieces 234a, 234b and that provides pressure on the spacer 374a to ensure proper insulation between the pieces 234a, 234b. A second insulating spacer 374b prevents the bolt 228 from shorting the pieces 234a, 234b. The insulating spacers 374a and 374b may be made of suitable electrically nonconductive plastic materials such as, for example, nylon. A step corresponding to the step 280 in the axle piece 234b may be molded into the second spacer 374b so that when the bolt 228 is inserted into the axle piece 234b, friction will cause the second spacer 374b to be displaced to the position shown in FIG. 4A, which ensures proper electrical insulation of the bolt 228 from both of the axle pieces 234a and 234b. In some embodiments, the second spacer 374b substantially fills the entire length of the axle 234.

The wires 378 can be soldered to the PCBA 334 and to holes in the axle pieces 234a, 234b. Preferably, the surfaces of the two pieces 234a, 234b that are press fit are shaped (e.g., by keying or by a spline) to prevent the pieces 234a and 234b from rotating relative to each other. Although the PCBA 334 is shown as mounted to the axle piece 234a in FIG. 4A, in other embodiments the PCBA 334 is mounted to an insulated chassis (e.g., the chassis 312 in FIGS. 3A-3C), which is mounted to the axle 234.

Figure 4A:
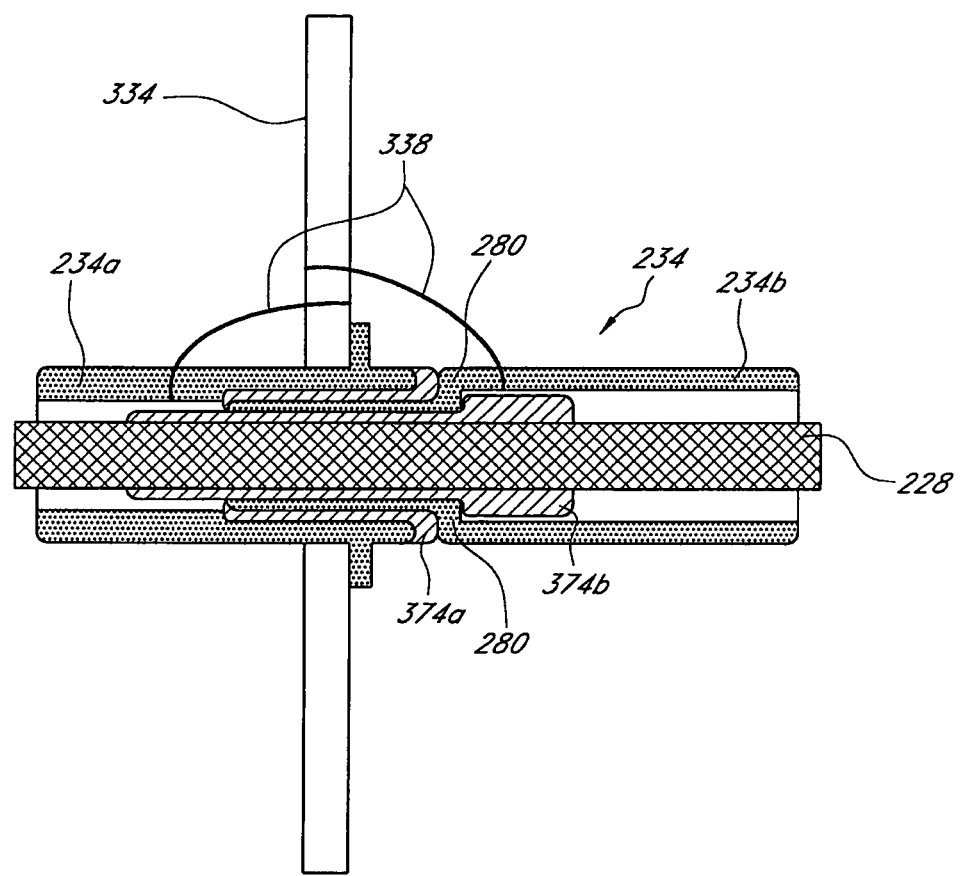
FIG. 4A is a cross-section view of an embodiment of an electrically split axle that can be used to route power from the wheel to off-wheel electrical systems.
Figure 4B:
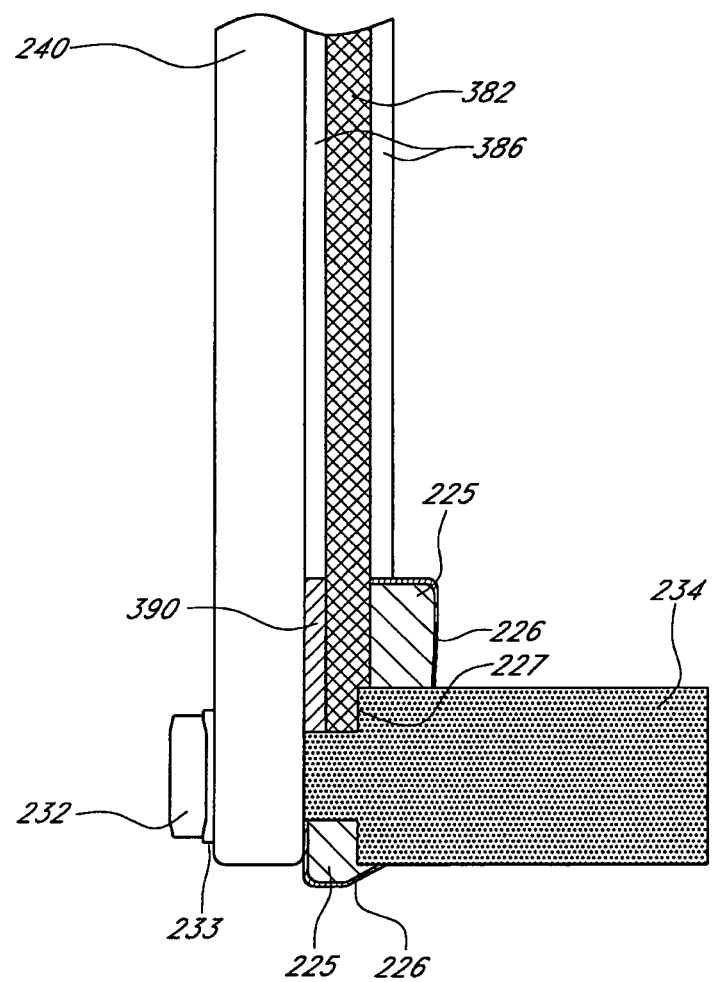
FIG. 4B is a cross-section view showing a portion of the wheel assembly connected to the electrically split axle

FIG. 4B is a cross-section view of a portion of the wheel assembly, looking parallel to the ground and perpendicular to the wheel's axis of rotation. In this embodiment, the caster 240 comprises a non-conducting material, such as a plastic material. The axle 234 engages the retaining clip 225 similarly as described with reference to FIG. 2B. The bolt 228 can be secured to the caster 240 by the nut 232 and a (preferably insulating) washer 233. The retaining clip 225 is metal with a hard insulating coating 226. The insulating coating 226 typically needs to support only a few volts of breakdown voltage; accordingly, relatively thin layers of coating may be used. In some embodiments, powder coated steel or anodized aluminum are used for the retaining clip 225 and insulating coating 226 The pressure of the flat portion 235 of the axle 234 on the retaining clip 225 keeps the retaining clip 225 in electrical contact with an electrically conductive wire 382 at point 227, thereby providing an electrical path for the power to flow from the axle 234 to the wire 382. In some embodiments, the retaining clip 225 includes a recess or slot for the wire 382 to ensure good electrical contact at the point 227. The wire 382 can be routed to any other portion of the object where power is desired, for example, by passing the wire 382 through cart frame tubes. An insulating element 390 attached to or molded into the caster 240 provides additional mechanical containment of the wire 382. The portion of the wire 382 outside the retaining clip 225 is covered by insulation 386.

The electrically split axle 234 shown in FIGS. 4A and 4B advantageously provides reliable electrical contact between each axle piece 234a, 234b and the wire 382, while electrically isolating any of the exposed surfaces of the wheel assembly. In certain embodiments, the electrical isolation provided by the wheel assembly shown in FIGS. 4A and 4B is sufficient for currents up to about 100 mA and contact resistances up to several tens of milliohms. Additionally, the electrical contact point 227 is protected from physical contact with moisture and electrolytic liquids (e.g., salt water), which beneficially avoids galvanic corrosion at the contact point 227, since typically the wire 382 and the axle 234 are dissimilar metals. In embodiments suitable for carts, the electrically split axle 234 is preferably used on a non-swiveling wheel (e.g., a rear shopping cart wheel). Also, in embodiments in which a two-way communication system and/or a navigation system are disposed in the wheel, fabricating the caster 240 from nonconductive materials beneficially provides from less electromagnetic interference with antennas and magnetic sensors, because there is less conductive (and/or ferromagnetic) material close to an antenna.

IV. Power System Control Circuit

The power system includes a control circuit to regulate and control electrical power provided by the generator 313. In some embodiments, the control circuit is used to regulate the charging and discharging of the electric storage device 330. The control circuit may comprise one or more microcontrollers, which can be configured to perform the control functions discussed herein via hardware, software, and/or firmware instructions.

In embodiments of the power system comprising an AC generator 313, it is preferable, but not necessary, for the control circuit to include a rectification circuit that converts the generator's AC current into a DC current. The rectification circuit can include a full-wave rectifier and/or a half-wave rectifier. In some embodiments, the rectification circuit comprises a single-phase, diode bridge rectifier having capacitive filtering. Further aspects of the rectification circuit are discussed below.

In embodiments of the electrical storage device 330 using a capacitor bank connected in series, the power system may use one or more charge balancing techniques to, for example, reduce the likelihood that one (or more) of the capacitors in the bank exceeds its maximum rated voltage. Since the capacitors in the bank will have a certain amount of variance in their individual capacitances, charge balancing can beneficially reduce variances in voltage across the capacitors and variances in charging times. Some embodiments provide charge balancing by using a resistor balancing network (typically in parallel with the capacitors) or a voltage comparator to direct excess charge to ground. In certain preferred embodiments, the power system control circuit monitors the charge on the capacitors so as to provide more accurate charge balancing over a wide range of charging conditions.

The power system control circuit may also monitor ambient temperature to correct for certain temperature-dependent effects found in ultracapacitors. In one of these effects, as the temperature decreases, the ESR of the ultracapacitor increases. Thus, the available energy the ultracapacitor can deliver to a high current load (e.g., a wheel locking mechanism) decreases as the temperature decreases. In another effect, as the temperature decreases, the voltage to which the ultracapacitor can be charged without permanently degrading the ultracapacitor's performance increases. To achieve a desired level of performance over an operating temperature range, these effects disadvantageously require selection of higher capacity ultracapacitors (which are more expensive), because the charging voltage must be calculated based on the highest operating temperature and the ESR must be based on the lowest operating temperature. Accordingly, in some embodiments, the power system comprises a temperature sensor, and the control circuit is configured to adjust the charging voltage based on the temperature so as provide more consistent performance across a wide temperature range. For example, in an embodiment, the control circuit charges the ultracapacitor to higher voltage at lower temperatures in order to compensate for the ultracapacitor's higher internal resistance (ESR) at lower temperatures. It is preferred, but not necessary, for the temperature sensor to be disposed in proximity to the ultracapacitors so as to measure their temperature more accurately. In some embodiments a separate temperature sensor is utilized. However, in other embodiments, one of the other components in the system may comprise a temperature sensor. For example, in one embodiment, the temperature sensor is a part of a transceiver disposed in the wheel 212 as part of a communication system.

The control circuit may also be configured to provide separate voltages to different on- or off-wheel systems. For example, the brake system may require a higher voltage (e.g., 5 V) and may draw more current than other electronic components (such as microprocessors and transceivers). Additionally, some electronic components preferably need a regulated voltage source, while other components (such as a brake motor) do not need regulated voltage. Accordingly, some embodiments of the control circuit provide beneficially provide two or more operating voltages, one or more of which may be voltage regulated.

Although in the embodiments shown in FIGS. 3A-3E the control circuit is disposed on the PCBA 334 in the wheel 212, this is not a requirement of the power system. In some embodiments, some or all of the control circuit is disposed in the wheel 212, in the wheel assembly 210, and/or elsewhere in the object such as, for example, in the frame or in the handlebars of a cart. Likewise, the electrical storage device 330 can be disposed in locations outside the wheel 212.

a. Example Power System Control Circuit

As discussed herein, certain preferred embodiments of the wheel power system comprise a generator, an electric storage device, and a control circuit. The control circuit can be configured to perform a variety of functions in the power system such as, for example, regulating the charging and discharging of the electric storage device, charge balancing a bank of capacitors, regulating temperature dependent capacitor effects, and providing suitable power to system components both on and off the wheel.

An embodiment of a control circuit 400a will be discussed with reference to the circuit diagram shown in FIG. 5A. In this circuit diagram, bold lines indicate electrical paths through which power flows in the ordinary operation of the power system. Non-bold lines indicate electrical paths used for monitoring and/or control functions or for exception conditions. Table 1 shows examples of selected components used in the control circuit 400a.

TABLE 1

| Reference | Manufacturer | Part Number | Relevant Attributes |
| --- | --- | --- | --- |
| C1, C2 | Cooper Bussmann | B1010-2R5155 | 1.5 F. capacitance, 0.3 Ohm ESR |
| D1–D6 | ON Semiconductor | MBR0520 | Low voltage drop at moderate current |
| Q1, Q2 | Fairchild Semiconductor | FDN337N | Low leakage in off state ($V_{gs} = 0$) |
| U1 | Microchip Technologies | MCP1700 | Low dropout voltage, low ground current |

TABLE 1-continued

| Reference | Manufacturer | Part Number | Relevant Attributes |
| --- | --- | --- | --- |
| U2 | Atmel Corp. | ATMega168V | 1.8-V operation, low power, peripheral circuits (counter, timer, ADC) |

Figure 5A:
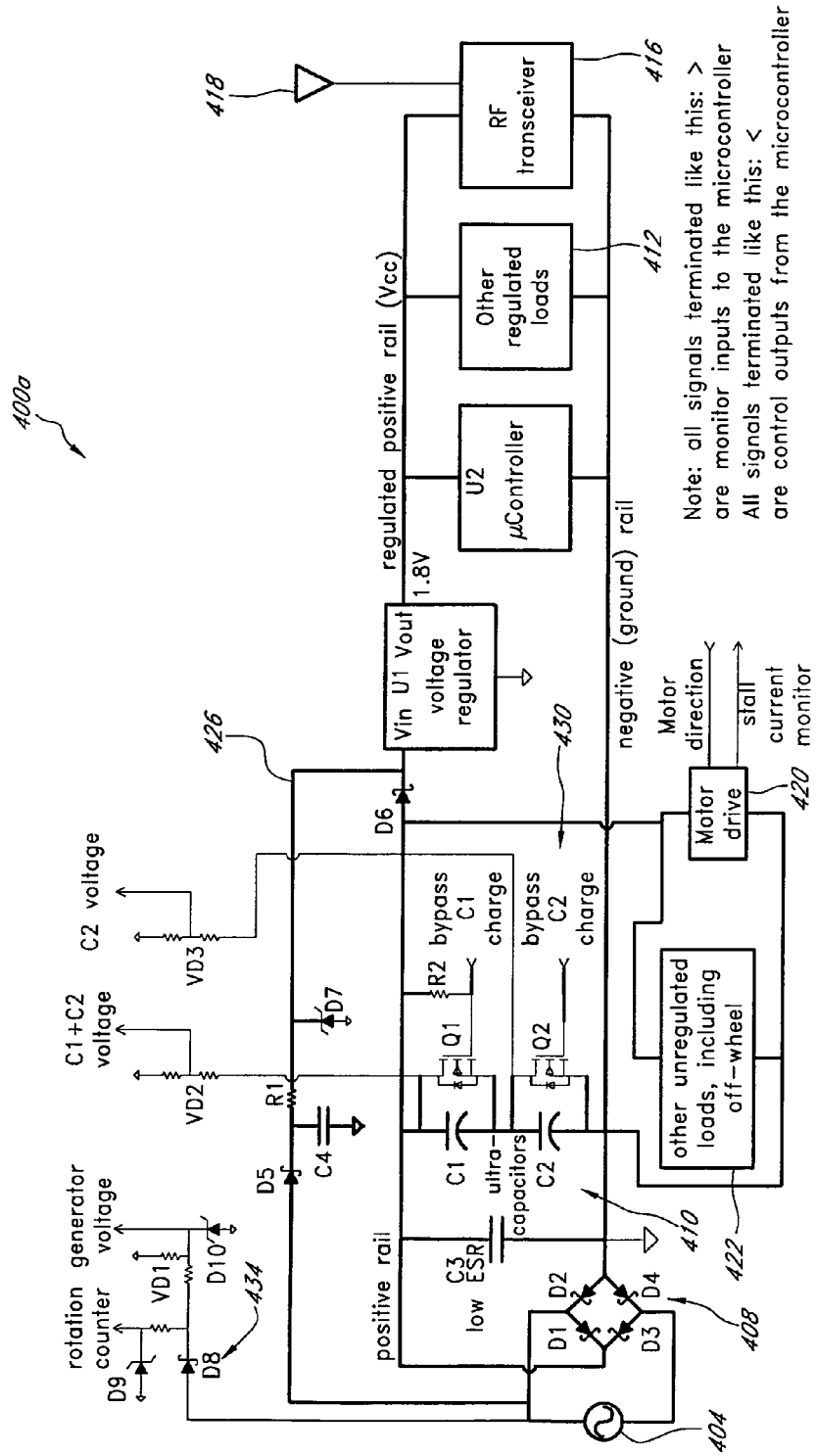
FIG. 5A is a circuit diagram of an embodiment of a control circuit configured to regulate the charging and discharging of a capacitor bank and to provide suitable voltages for other electronic devices.

As shown in FIG. 5A, a generator 404 provides power to the circuit 400a. In this embodiment, the generator 404 comprises an AC generator that produces an AC current. The AC current is passed to a rectifier 408, which in this embodiment is a full-wave rectifier. The power from the generator 404 is directed to an electrical storage device 410, which in this preferred embodiment is a capacitor bank comprising ultracapacitors C1 and C2 connected in series. In other embodiments, the electrical storage device 410 further comprises a small capacity, low self-discharge backup battery, which is used to power other electrical components if the ultracapacitors C1 and C2 discharge below a minimum operating voltage for the other components.

The generator 404 provides unregulated power to various system loads such as, for example, a motor drive 420 that actuates a wheel locking or braking mechanism and other unregulated loads 422. Some of these loads, such as the motor drive 420, require relatively high power but only at intermittent times (e.g., to lock or unlock the wheel). For example, some embodiments of the brake system may require about 4 Joules of energy delivered at source voltages greater than about 2 V to perform a lock/unlock cycle.

The generator 404 also provides regulated power to other system loads such as, for example, a microcontroller U2 and a radio frequency (RF) transceiver 416 (with antenna 418). The generator 404 may also power other regulated loads such as, for example, a navigation system, a communication system, a display, and other processors and controllers. The power from the generator 404 is regulated by a voltage regulator U1, which in some embodiments comprises a low dropout (LDO) voltage regulator. In the example circuit 400a, the voltage regulator U1 provides a stable output voltage of 1.8 V, which is suitable for the microcontroller U2. In other embodiments, the regulated voltage may range from about 1.5 V to about 5 V. One embodiment provides a higher regulated voltage by using a boost DC-DC converter.

Various features of the example control circuit 400a will now be discussed with reference to FIG. 5A and the example components listed in TABLE 1.

i. Capacitor Bank Charging

The AC output of the generator 404 is rectified by the fall wave rectifier 408, which comprises diodes D1-D4. In order for the ultracapacitor bank 410 to be charged, the generator's peak voltage must be greater than a charging voltage which is equal to twice the voltage drop across the diode D1 plus the current series voltage on the ultracapacitor bank 410 (e.g., C1 and C2). In various embodiments using Schottky diodes for D1-D4 (e.g., MBR0520 diodes from ON Semiconductor), the forward drop is about 275 mV minimum per diode for any reasonable charging current (e.g. about 100 ma at room temperature).

Power is available from the generator 404 to power the regulated loads (e.g., microcontroller U2, the RF transceiver 416, and other regulated loads 412) once the voltage across the ultracapacitor bank 410 exceeds the minimum operating voltage of the voltage regulator U1 (e.g., about 2.3 V for the MCP1700 LDO from Microchip Technologies) plus the forward drop of diode D6 at the regulated load current (e.g., about 200 to 250 mV depending on load current).

ii. Bootstrap Power

When the capacitor bank 410 (e.g., C1 and C2) has discharged to the point where the capacitor bank 410 is below the dropout voltage for the regulator U1, the microcontroller U2 can no longer operate reliably from the stored energy in the capacitor bank 410. A bootstrap power path 426 through diode D5 provides a secondary, low current, half wave rectifier for the power output of the generator 404. The generator 404 charges a reservoir capacitor C4 relatively quickly. A resistor R1 causes load current to be pulled preferentially from the full wave rectifier 408 (e.g., diodes D1-D4) once the ultracapacitor bank 410 has charged above the minimum operating voltage for the voltage regulator U1. Diode D7 limits the voltage through the bootstrap power path 426 to the maximum allowable input voltage of the voltage regulator U1 (e.g. 6.0 V for the MCP1700).

In a representative embodiment, a minimum output frequency of the generator 404 is about 100 Hz, and the mean load current of the microcontroller U2 plus the RF transceiver 416 is on the order of 2 milliamps. Accordingly, the charge which the reservoir capacitor C4 must deliver across one 10 millisecond cycle of the generator 404 is no more than about 20 microCoulombs. A 50 µF capacitor may be used for the reservoir capacitor C4 and will deliver about 20 microCoulombs of charge with a voltage drop of about 0.4 V. Therefore, in such an embodiment, the bootstrap charging voltage for the reservoir capacitor C4 need only be about equal to the minimum charging voltage of the voltage regulator U1 plus the voltage drop across the reservoir capacitor C4. The bootstrap charging voltage is about 2.7 V if the voltage regulator U1 is an MCP1700 (Microchip Technologies). The bootstrap charge on the reservoir capacitor C4 is sufficiently low that even a relatively low power generator 404 will be able to charge the reservoir capacitor C4 to the minimum charging voltage of the voltage regulator U1 within a few seconds of rotational motion. Accordingly, use of the bootstrap power path and the reservoir capacitor C4 advantageously permits regulated loads to operate within a few seconds of motion of the object, even if the ultracapacitor bank 410 is fully discharged.

iii. Charge Balancing of the Capacitor Bank

As discussed above, it is preferable, but not necessary, to charge balance two or more capacitors connected in series, because the capacitors (e.g., C1 and C2) will have some variance in their capacitance. For example, two nominally identical ultracapacitors can differ in their actual capacitance by a factor of about two. The Cooper Bussmann B1010-2R5155 EDLC ultracapacitor has a manufacturing tolerance of −20% to +80% based on the nominal 1.5 F capacitance value. Moreover, an ultracapacitor can be damaged if its maximum charge voltage is exceeded. Since the amount of charge carried on two series capacitors is the same, the maximum charge voltage will be limited by the need to avoid overcharging the lowest capacitance ultracapacitor, if there is no means of steering charge to or from the individual ultracapacitors of the bank For example, in a two-capacitor bank, if the maximum charge voltage is 2.5 V, and one nominally 1.5 F ultracapacitor has a capacitance that is 10% low, e.g., 1.35 F, while the other has a capacitance that is 70% high, e.g., 2.55 F, then 3.375 Coulombs is needed to charge the 1.35 F capacitor to 2.5 V. However, this amount of charge will charge the larger capacity ultracapacitor to only 1.32 V (e.g., 3.375 C/2.55 F). The total energy stored in the capacitor bank is the sum of the energies of the individual capacitors [e.g., $\frac{1}{2} C V^2$], namely, $\frac{1}{2} *(1.35 F*(2.5 V)^2 + 2.55 F*(1.32 V)^2)$ or 6.4 Joules. Fully charging each ultracapacitor to 2.5 V stores $\frac{1}{2}*(1.35 F*(2.5 V)^2 + 2.55 F*(2.5 V)^2)$ or 12.2 Joules, almost twice the energy.

The charge balancing circuit 430 comprises one transistor for each ultracapacitor in the capacitor bank 410. For example, transistors Q1 and Q2 perform charge balancing between the ultracapacitors C1 and C2. If the ultracapacitors C1 and C2 are fully charged, each of the transistors Q1 and Q2 can be made conducting to avoid overcharging the ultracapacitors C1 and C2. In one preferred embodiment, the transistors Q1 and Q2 are N channel enhancement mode FETs such as, e.g., an FDN337N FET from Fairchild Semiconductor.

In the embodiment shown in FIG. 5A, charge balancing is monitored and performed by the microcontroller U2, which measures the voltages on the ultracapacitors C1 and C2. The voltage on ultracapacitor C2 is determined by performing an analog-to-digital conversion on the output of voltage divider VD3, while the output of voltage divider VD2 provides a measurement of the combined voltages on the ultracapacitors C1 and C2. Accordingly, the voltage on the ultracapacitor C1 can be found by subtraction. If the voltage on the ultracapacitor C1 is higher than the voltage on the ultracapacitor C2, the microcontroller U2 puts the transistor Q1 into conduction until the voltages equalize, and similarly if the voltage on the ultracapacitor C2 is higher than the voltage on the ultracapacitor C1. In this embodiment, the transistor Q1's gate drive is pulled up through a resistor R2 and pulled down via an open collector driver included in or attached to the microcontroller U2, because the microcontroller U2 can only drive an output high to the regulated positive rail $V_{CC}$ (e.g., 1.8V for the ATMega 168V) rail. To put the transistor Q1 into conduction requires a positive Vgs across the transistor Q1 (e.g., >0.7 V for the FDN337N FET). If the ultracapacitor C2 is nearly fully charged, this voltage is above about 3.0 V.

iv. Rotation Monitor and Voltage Measurement Functions

In certain embodiments, the object includes a navigation system that determines the position of the object. For example, in certain preferred embodiments, the position of the object is tracked via a dead reckoning method that measures the object's heading and the distance traveled by object. In certain such embodiments, the distance traveled by the object is determined by measuring the amount of wheel rotation (e.g., under the assumption that the wheel does not slide, slip, or skid). Further details of a suitable navigation system are discussed in the Navigation Patent Application.

In certain embodiments, the generator 404 can act as a wheel rotation sensor for the navigation system, because the generator voltage varies with a frequency that is proportional to the wheel rotation frequency. In the embodiment of the generator 313 shown in FIG. 3D, the frequency of the generator voltage equals the wheel rotation frequency multiplied by the gear ratio between the generator drive gear ring 314 and the pinion gear 326. Accordingly, in some preferred embodiments, the voltage produced by the generator 404 is monitored and used as a wheel rotation counter. As shown in FIG. 5A, the rotation counter comprises a half wave rectifier, e.g., diode D8, which is voltage limited by a diode D9, and which provides a "rotation" input to the microcontroller U2. The rotation input can be counted by a counter circuit on the microcontroller U2 to determine the number of wheel rotations and thus, the distance traveled by the object. By suitably providing an elapsed time circuit (e.g., a clock on the microcontroller U2), the object's forward speed can be estimated from the number of wheel rotations and the elapsed time.

The diode D8 also provides an instantaneous measurement of the generator voltage during a positive half-cycle. The voltage measurement is reduced by the voltage divider VD1 to a suitable value for the range of an ADC on the microcontroller U2. A diode D10 also limits the voltage into the ADC in cases of extremely high generator voltage.

v. Wheel Brake Mechanism Drive

Power from the ultracapacitor bank 410 can be used to operate the motor drive 420 for the braking mechanism until the voltage on the ultracapacitor bank 410 is less than the minimum voltage needed to generate sufficient torque to disengage the brake. The minimum voltage depends on the details of the braking mechanism and the motor that drives the braking mechanism. In the embodiments shown in FIGS. 3A-3E, the minimum operating voltage is about 2.0 V.

The two-ultracapacitor bank 410 described herein has a worst case DC ESR after aging of about 1.5 Ohms and has a locking stall current on the order of 500 ma at 3.0 V. The voltage drop across the ultracapacitor bank 410 at locking stall is approximately 0.75 V in some embodiments. A buffer capacitor C3, having a low ESR, provides some buffering for high current transient loads such as, for example, the stall current of the motor drive 420 and the inductive kick from commutator switches in the motor drive 420.

It is preferable, but not necessary, for the brake mechanism's power source to be high compliance (e.g., having a low apparent source resistance). In the example circuit 400a shown in FIG. 5A, power is fed to the braking motor drive 420 (which may include a MOSFET H-bridge) directly from the ultracapacitor bank 410 in parallel with the buffer capacitor C3 but with no diodes in the path. Such a circuit provides high compliance power subject only to inherent limitations of the specific ultracapacitors chosen for the bank 410. If higher compliance is needed, then each series ultracapacitor in the ultracapacitor bank 410 can be replaced by two or more lower capacity ultracapacitors to reduce the circuit ESR. For example, two 300 milliohm ESR ultracapacitors connected in parallel have a circuit ESR of 150 milliohms. In some embodiments, a high-capacity high-ESR ultracapacitor is connected in parallel with a low-capacity, low-ESR ultracapacitor to form a high-capacity, low-ESR combination. For example, in one embodiment the high-capacity high-ESR ultracapacitor comprises a Cooper Bussmann B1010-2R5155 ultracapacitor, while the low-capacity, low-ESR ultracapacitor comprises a Cooper Bussmann A0820-2R5474 0.47 F, 150 milliohm ESR ultracapacitor.

vi. Decision Logic for Extended Time in a Wheel Lock State

In some situations, a wheel's brake mechanism is activated, and the wheel remains in the locked state for an extended period of time. Typically, energy stored in the ultracapacitor bank 410 is later used to unlock the wheel. However, the energy stored in the ultracapacitor bank 410 decays with time, because the ultracapacitors self-discharge. If the wheel is locked for too long a time period, the energy in the ultracapacitor bank 410 will be too small to unlock the wheel. At this point, the wheel will remain locked until commanded to unlock (e.g., by an authorized person who has a device that can issue a suitable unlock command). The energy to perform this unlock will have to come from an energy source other than the ultracapacitor bank 410. For example, in certain embodiments, a backup battery may contain sufficient energy to unlock the wheel. However, in other embodiments, the wheel will have to be supplied with power from an external source.

The ultracapacitor bank discharge time for the example embodiment depicted in FIG. 5A and TABLE 1 is typically a few days. However, the discharge time may be shorter if the ultracapacitor bank 410 was not fully charged before the wheel locked.

Certain embodiments of the control circuit 400a beneficially avoid leaving a wheel in an extended lock state, by unlocking the wheel at a point where the ultracapacitor bank 410 has just enough energy to perform a wheel unlock cycle. In such embodiments, the microcontroller U2 periodically monitors the charge state of the ultracapacitor bank 410 to determine whether the ultracapacitors have reached this point. After unlocking the wheel, the wheel can rotate freely, and the object (to which the wheel is attached) can be moved.

In certain situations, it may be undesirable to leave the wheel unlocked, because the object can be stolen. Accordingly, in some embodiments, the microcontroller U2 can be configured to implement the following decision logic in this situation. The decision logic depends on whether or not the wheel includes a backup power source (e.g., a backup battery).

In the case where the wheel does not have a backup power source, if the wheel begins rotating again, the microcontroller U2 waits until the ultracapacitor bank 410 has charged sufficiently to perform a complete lock/unlock cycle. The microcontroller U2 then signals the wheel to lock again. The rationale behind this decision logic is that the wheel initially locked correctly (e.g., the object was being stolen), and the object was then abandoned after the wheel locked. By subsequently unlocking the wheel, the decision logic acts under the assumption that unlocking the wheel when the ultracapacitor bank 410 has just enough energy left to unlock the wheel is unlikely to result in the object being moved again. Alternatively, if the cart does move after the microcontroller U2 unlocks the wheel, the rationale assumes that permitting the object to move far enough to recharge the ultracapacitor bank 410 will not significantly affect the object's chance of being ultimately recovered.

In an alternate embodiment of the decision logic, the wheel is immediately locked by the backup power supply if the wheel begins to rotate again. In this alternate embodiment, the rationale is that subsequent motion of the wheel is likely to lead to the loss of the object. In certain embodiments, different choices for the decision logic can be made when the control circuit 400a is initialized, for example, by storing a suitable flag in nonvolatile memory (e.g., EEPROM).

A further embodiment uses a low-current-capacity backup battery that is not capable of unlocking the wheel. In such an embodiment, the wheel is unlocked when the ultracapacitor bank 410 discharges to the point where it contains the minimum energy to reliably perform the unlock cycle. If the wheel is subsequently moved by an unauthorized person or in an unauthorized way, the microcontroller U2 waits until the ultracapacitor bank 410 is sufficiently charged so as to perform a complete lock/unlock cycle. The microcontroller U2 then signals the wheel to lock again. Certain embodiments of the wheel locking mechanism require a peak current of about 500 mA to perform an unlock cycle. Many commercially available batteries utilize battery chemistries that have a sufficiently high internal resistance that the current they produce is insufficient to lock or unlock various preferred embodiments of the brake mechanism.

vii. Auxiliary Backup Battery

In some embodiments, the wheel comprises an auxiliary backup battery that acts as a source of power when the energy in the ultracapacitor bank is low. The backup battery typically comprises a non-rechargeable battery such as an alkaline or primary lithium battery, although rechargeable batteries such as lithium ion batteries may be used in other embodiments. A float charge voltage is applied across the non-rechargeable battery in certain embodiments, which may reduce the self-discharge rate of the battery.

FIG. 5B is a circuit diagram showing an embodiment of a power system control circuit 400b including a backup battery system 450 and an optional charging circuit 460 (used to recharge rechargeable backup batteries). The control circuit 400b is configured to provide power to unregulated loads 420 and 422 and the regulated loads U2, 412, and 416.

After a discharge time, an initially fully charged capacitor bank 410 will self-discharge to a point where the voltage is not high enough to power the voltage regulator U1. The microcontroller U2, which periodically monitors the voltage on the ultracapacitors C1 and C2, puts a transistor Q3 into conduction (e.g., the gate of the transistor Q3 is pulled up through a resistor R4 so that the transistor Q3 is fully saturated). When the transistor Q3 begins conducting, the backup battery will start charging the ultracapacitors C1 and C2, with a current limited by the ESR of the ultracapacitors C1 and C2. The microcontroller U2 then turns off the transistor Q3. The regulated loads then are powered by the energy transferred from the backup battery to the ultracapacitor bank 410, until the bank 410 again discharges sufficiently, at which point this cycle repeats.

If a wheel lock condition is detected and there is not enough energy in the ultracapacitor bank 410 to perform the lock, the microcontroller U2 puts the transistor Q3 into conduction so as to add enough charge to the ultracapacitor bank 410 to perform the lock, after which the microcontroller 410 turns off the transistor Q3. Similar decision logic applies if there is insufficient energy to perform an unlock.

In certain embodiments, the backup battery runs only the microcontroller U2 and the other regulated loads 412 and 416. In such embodiments, the control circuit 400b is modified by connecting the output of the transistor Q3 to the cathode side of the diode D6 (rather than the anode side as shown in FIG. 5B). The transistor Q3 is made conducting whenever the voltage of the ultracapacitor bank 410 is below the minimum needed to run the voltage regulator U1. In these embodiments, the diode D6 is included in the control circuit, regardless of whether the bootstrap power path 426 is used. Some embodiments beneficially use the backup battery system 450 instead of the bootstrap power circuit (e.g., the portion of the circuit including the diodes D5, D6, D7, the capacitor C4, and the resistor R1).

viii. Powering an Ultracapacitor Bank

A test was performed to measure properties of one embodiment of the power system. The ultracapacitor bank comprised three Cooper Bussmann PowerStor B0830-2R5475 EDLC ultracapacitors (1.6 F and 0.45 Ohm nominal ESR) in series. The ultracapacitor bank had a maximum working voltage of 7.5 V. Diodes D1-D4 in the full wave rectifier were BAT54T Schottky barrier diodes (Diodes Inc, Westlake Village, Calif.), which were chosen for their low forward drop at low currents. A Zener shunt regulator LM432 (National Semiconductor Corp., Santa Clara, Calif.) was connected in parallel with the ultracapacitor bank to limit the voltage drop across the bank to be about 7.2 V.

TABLE 2

| time (s) | test voltage (V) | simulation voltage (V) | average power to ultracap (mW) | average current (mA) | worst case diode + ESR drop (V) | estimated power generated (mW) |
|---|---|---|---|---|---|---|
| 10 | 1 | 1.2 | 78 | 157 | 1.5 | 315 |
| 17 | 1.5 | 1.8 | 140 | 112 | 1.4 | 291 |
| 24 | 2 | 2.2 | 196 | 112 | 1.3 | 345 |
| 32 | 2.5 | 2.7 | 220 | 98 | 1.3 | 352 |
| 42 | 3 | 3.2 | 215 | 78 | 1.2 | 312 |
| 51 | 3.5 | 3.6 | 283 | 87 | 1.2 | 391 |
| 61 | 4 | 4.0 | 294 | 78 | 1.2 | 391 |
| 72 | 4.5 | 4.4 | 303 | 71 | 1.2 | 390 |
| 85 | 5 | 4.9 | 286 | 60 | 1.0 | 348 |
| 100 | 5.5 | 5.4 | 274 | 52 | 1.1 | 330 |
| 114 | 6 | 5.8 | 322 | 56 | 1.0 | 378 |
| 132 | 6.5 | 6.3 | 272 | 44 | 1.0 | 315 |
| 152 | 7 | 6.8 | 264 | 39 | 0.9 | 301 |
| | | | mean power harvested (mW) | 253 | estimated mean power generated (mW) | 340 |

TABLE 2 shows the results of an experiment on the test embodiment power system. The generator (shown in FIG. 3D) was driven by a mechanical drill motor, thereby providing a sinusoidal generator output with an approximate frequency of 330 Hz and a wheel rotation of approximately 165 RPM. The voltage across the ultracapacitor bank was recorded as a function of time while the generator was in motion. In TABLE 2, results in the column labeled "Worst case diode drop+ESR drop (V)" were estimated from the diode datasheet at twice the average current for each voltage step (note that there are two diode drops, e.g., D1 and D4, for the positive generator phase). Also, the ESR was taken from the ultracapacitor datasheet (and may be somewhat conservative).

TABLE 2 also shows the results of a discrete time simulation which treated the generator as a constant power source regardless of load current. In this simulation, it was assumed that the generator produced an instantaneous power of $(\pi/2) \cdot 0.31$ (mW)·sin $\omega t$ and produced a maximum voltage of 13(V) ·sin $\omega t$. The discrete time simulation modeled the diode voltage drop across the full wave rectifier according to an exponential fit, which had an accuracy of about 0.05V over the voltage ranges in the test. TABLE 2 shows that the results of the discrete time simulation are close to the test results, with the simulation results being slightly more optimistic at low ultracapacitor charge levels and slightly more pessimistic at higher charge levels The results in TABLE 2 show that one embodiment of the power system operating at speeds typical of a cart propelled by human locomotion is able to produce an average usable power of about 250 mW. The total energy that can be stored in an ultracapacitor bank comprising two Cooper Bussmann B1010-2R5155 EDLC's nominally rated at 1.5 F and having a working voltage of 5.0 V is 9.4 Joules, which can be harvested in less than about 40 seconds of use with this embodiment. At a walking speed of about 2 ft/sec, the object is moved through a distance of about 80 feet to fully charge the ultracapacitor bank. Accordingly, an ultracapacitor bank disposed in a wheeled object (e.g., a shopping cart) is likely to be rapidly charged by certain embodiments of the generator disclosed herein.

In some embodiments, the ultracapacitor bank can hold its charge for several days or longer, which is typically much longer than the time intervals between when the object is moved (and the generator is operated). Thus, for example, in a retail store environment the ultracapacitor bank will likely remain fully charged with even moderate and intermittent use by customers. In the event that a cart is removed from a confinement area surrounding the retail store, the ultracapacitor bank will contain sufficient stored electrical energy to actuate a locking mechanism to inhibit theft of the cart.

Although the invention(s) have been described in terms of certain preferred embodiments and certain preferred uses, other embodiments and other uses that are apparent to those of ordinary skill in the art, including embodiments and uses which do not provide all of the features and advantages set forth herein, are also within the scope of the invention(s). Accordingly, the scope of the invention(s) is defined by the claims that follow and their obvious modifications and equivalents.

What is claimed is:

1. A power generator configured for use on a non-self-powered, wheeled vehicle, the power generator comprising:
    a housing comprising windings;
    a magnetized element disposed within the housing and operable to rotate about an axis;
    a drive mechanism configured to cause the magnetized element to rotate in response to rotation of the wheel, wherein the rotation of the magnetized element produces electrical power in the windings so as to enable the generator to supply electrical power; and
    a control circuit configured to provide the electrical power at two or more voltages,
    wherein the housing, the magnetized element, and the drive mechanism are disposed within a wheel of the non-self-powered vehicle.

2. The power generator of claim 1, wherein the power generator is configured to supply power to an electronic component located on the non-self-powered vehicle.

3. The power generator of claim 2, wherein the electronic component is a two-way communication system.

4. The power generator of claim 2, wherein the electronic component is a video display.

5. The power generator of claim 2, wherein the electronic component is an audio speaker.

6. The power generator of claim 2, wherein the electronic component is a navigation system.

7. The power generator of claim 2, wherein the electronic component is configured to inhibit movement of the vehicle.

8. The power generator of claim 1, further comprising a stator located substantially on the axis and wherein the magnetized element comprises a rotor.

9. The power generator of claim 1, wherein the power generator is configured to supply power to an energy reservoir also located on said non-self-powered vehicle.

10. The power generator of claim 9, wherein the energy reservoir is located in the wheel.

11. The power generator of claim 9, wherein the energy reservoir comprises one or more capacitive storage devices.

12. The power generator of claim 11, further comprising a battery adapted to store electrical energy.

13. The power generator of claim 12, wherein the battery comprises a rechargeable battery.

14. The power generator of claim 12, wherein the battery is configured to provide supplemental power.

15. The power generator of claim 11, wherein the one or more capacitive storage devices comprises one or more ultracapacitors.

16. The power generator of claim 15, wherein the one or more ultracapacitors comprise at least two charge balanced ultracapacitors connected in a series configuration.

17. The power generator of claim 15, further comprising a temperature sensor, and wherein the control circuit is further configured to monitor the temperature sensor and correct for temperature-dependent effects of the one or more ultracapacitors.

18. The power generator of claim 1, further configured to power a system configured to inhibit motion of the vehicle.

19. The power generator of claim 1, further configured to power a wheel braking system control circuit.

20. The power generator of claim 19, wherein the wheel braking system control circuit comprises a power management system for moving a brake from a first state to a second state and maintaining the brake in the second state until occurrence of a predetermined condition.

21. The power generator of claim 20, wherein the predetermined condition is an externally produced signal requesting a change of state of the brake.

22. The power generator of claim 20, wherein the predetermined condition is reflective of energy required for producing a change of state of the brake.

23. The power generator of claim 1, wherein the drive mechanism is configured such that the magnetized element rotates at a predetermined multiple of the rotation rate of the wheel.

24. The power generator of claim 23, wherein the predetermined multiple is between about 10 and about 15.

25. The power generator of claim 1, wherein the drive mechanism comprises a gear train.

26. The power generator of claim 25, wherein the gear train comprises a drive gear configured to rotate with the wheel and a pinion gear attached to the magnetized element, the drive gear mechanically coupled to the pinion gear.

27. The power generator of claim 26, wherein the drive gear is mechanically coupled to the pinion gear by secondary gearing configured to float on the drive gear.

28. The power generator of claim 25, wherein the gear train comprises at least one gear that rotates substantially synchronously with the wheel and at least one gear that rotates substantially synchronously with the magnetized element.

29. The power generator of claim 1, wherein at least one of the two or more voltages comprises a regulated voltage.

30. The power generator of claim 29, wherein at least one other voltage comprises an unregulated voltage.

31. A power management system configured for use on a moveable object having a wheel, the power management system comprising:
    a generator operative in response to movement of the object;
    a capacitive energy storage reservoir connected to the generator; and
    an electronic control system configured to control power usage from the reservoir based upon a level of energy in said reservoir;

wherein the generator, the capacitive energy storage reservoir, and the electronic control system are disposed within the wheel.

32. The power management system of claim 31, wherein the storage reservoir comprises at least one ultracapacitor.

33. The power management system of claim 31, wherein the electronic control system is configured to regulate an amount of charge in the capacitive energy storage reservoir.

34. The power management system of claim 31, wherein the storage reservoir comprises a battery.

35. The power management system of claim 31, wherein the electronic control system is configured to provide a regulated voltage.

36. The power management system of claim 35, wherein the electronic control system is further configured to provide an unregulated voltage.

37. The power management system of claim 31, wherein the generator comprises a rotor that is configured to rotate at a predetermined multiple of the rotation rate of the wheel.

38. The power management system of claim 31, wherein the electronic control system is further configured to provide a regulated voltage from the generator if the level of energy in the capacitive energy storage reservoir is below a threshold.

39. A braking system for a wheel of an object, the braking system comprising:
    a brake mechanism associated with the wheel so as to brake or release the rotation of the wheel;
    a controller associated with the brake mechanism and configured to cause the brake mechanism to brake or release wheel rotation;
    a power storage device connected to supply power to the brake mechanism in response to signals from the controller; and
    a generator in or on the wheel and configured to provide power to the storage device, said generator operative in response to rotation of the wheel,
    wherein the controller is configured to monitor a level of electrical energy in the power storage device.

40. The braking system of claim 39, wherein the object is a cart.

41. The braking system of claim 40, wherein the cart is a shopping cart.

42. The braking system of claim 40, wherein the cart is configured to move in response to manually applied force.

43. The braking system of claim 39, wherein the power storage device comprises at least one ultracapacitor.

44. The braking system of claim 39, wherein the controller is configured to cause the brake mechanism to brake or release in response to occurrence of one or more predetermined criteria.

45. The braking system of claim 44, wherein the one or more criteria include the level of energy in the energy storage reservoir.

46. The power management system of claim 39, wherein the generator comprises a rotor that is configured to rotate at a predetermined multiple of the rotation rate of the wheel.

47. A power generation system configured for use on a non-self-powered vehicle having a wheel, the power generation system comprising:
    a generator disposed within the wheel, the generator configured to convert rotation of the wheel into electrical energy;
    an electrical energy storage device electrically coupled to the generator and configured to store a portion of the electrical energy, the storage device disposed in the non-self-powered vehicle; and
    a power management system electrically coupled to the generator and the storage device, the power management system configured to monitor a level of electrical energy in the storage device.

48. The power generation system of claim 47, wherein the non-self-powered vehicle is a cart.

49. The power generation system of claim 48, wherein the cart is a shopping cart.

50. The power generation system of claim 47, wherein the electric storage device comprises at least one ultracapacitor.

51. The power generation system of claim 47, wherein the electric storage device is disposed within the wheel.

52. The power generation system of claim 47, wherein the power generation system is configured to provide electrical energy to a component disposed in or on the non-self-powered vehicle.

53. The power generation system of claim 52, wherein the component is configured to inhibit motion of the non-self-powered vehicle.

54. The power generation system of claim 52, wherein the component is disposed within the wheel.

55. The power generation system of claim 54 wherein the component is a wheel brake mechanism movable between a locked position, wherein the rotation of the wheel is substantially inhibited, and an unlocked position, wherein the rotation of the wheel is substantially permitted.

56. The power generation system of claim 55, wherein the power management system is further configured to signal the wheel brake mechanism to move between the locked position and the unlocked position if the electrical energy stored in the electric storage device reaches a threshold value.

57. The power generation system of claim 56, wherein the threshold value is related to an amount of electrical energy used to move the wheel brake mechanism from the locked position to the unlocked position.

58. The power generation system of claim 47, wherein the generator comprises a rotor that is configured to rotate at a predetermined multiple of the rotation rate of the wheel.

59. The power generation system of claim 47, wherein the power management system is configured to provide the electrical energy at two or more voltages.

60. The power generation system of claim 59, wherein the two or more voltages comprise a regulated voltage and an unregulated voltage.

61. The power generation system of claim 47, wherein the power management system further comprises a bootstrap power system.

62. A power system in a non-self-powered object having a wheel, the power system comprising:
    means for generating electrical power from rotation of the wheel;
    means for storing electrical power;
    means for charging the storage means by using power from the generating means; and
    means for providing electrical power from the charging means at two or more operating voltages,
    wherein the generating means, the storing means, the charging means, and the providing means are disposed within the wheel.

63. The power system of claim 62, wherein the means for storing electrical power comprises at least one ultracapacitor.

64. The power system of claim 62, wherein the means for storing electrical power comprises a rechargeable battery.

65. The power system of claim 62, further comprising means for distributing the electrical power from the generating means or the storing means to an electrical component.

66. The power system of claim 65, wherein the electrical component is a two-way communication system.

67. The power system of claim 65, wherein the electrical component is a navigation system.

68. The power system of claim 65, wherein the electrical component is a display device.

69. The power system of claim 65, wherein the electrical component is a brake system.

70. The power system of claim 65, wherein the electrical component is configured to inhibit motion of the non-self-powered object.

71. The power system of claim 65, wherein the electrical component is a wheel steering system.

72. The power system of claim 62, wherein the means for generating electrical power from rotation of the wheel comprises a generator having a magnetized element, the magnetized element mechanically coupled to the wheel and configured to rotate at a predetermined multiple of the rotation rate of the wheel.

* * * * *

UNITED STATES PATENT AND TRADEMARK OFFICE
CERTIFICATE OF CORRECTION

| | | |
|---|---|---|
| PATENT NO. | : 8,820,447 B2 | Page 1 of 1 |
| APPLICATION NO. | : 11/277029 | |
| DATED | : September 2, 2014 | |
| INVENTOR(S) | : Scott J. Carter et al. | |

It is certified that error appears in the above-identified patent and that said Letters Patent is hereby corrected as shown below:

In the Specification

In column 2 at line 43, change "axle" to --axle.--.

In column 3 at line 57, change "rings" to --rings.--.

In column 4 at line 42, change "that that" to --that--.

In column 22 at line 64, change "levels" to --levels.--.

In the Claims

In column 23 at line 43, in Claim 1, change "voltages," to --operating voltages,--.

In column 25 at line 55, in Claim 46, change "power management system" to --braking system--.

Signed and Sealed this
Eighteenth Day of August, 2015

Michelle K. Lee
*Director of the United States Patent and Trademark Office*